US011615451B2

(12) United States Patent
Phillips et al.

(10) Patent No.: US 11,615,451 B2
(45) Date of Patent: Mar. 28, 2023

(54) METHOD, MEDIUM, AND SYSTEM FOR AN INTEGRATION PLATFORM FOR INTERFACING WITH THIRD PARTY CHANNELS

(71) Applicant: PAYPAL, INC., San Jose, CA (US)

(72) Inventors: Ashley Phillips, San Jose, CA (US);
Christopher Sanger, San Jose, CA (US); Clint Ecker, San Jose, CA (US); Micah Koga, San Jose, CA (US); Nina Zakharenko, San Jose, CA (US); Rohit Turumella, San Francisco, CA (US); Joshua Knox, San Jose, CA (US); Harper Reed, San Jose, CA (US); Dylan Richard, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 469 days.

(21) Appl. No.: 16/903,036

(22) Filed: Jun. 16, 2020

(65) Prior Publication Data
US 2020/0380513 A1 Dec. 3, 2020

Related U.S. Application Data

(63) Continuation of application No. 15/346,274, filed on Nov. 8, 2016, now Pat. No. 10,685,352.
(Continued)

(51) Int. Cl.
*G06Q 30/00* (2012.01)
*G06Q 30/0601* (2023.01)
(Continued)

(52) U.S. Cl.
CPC ......... *G06Q 30/0613* (2013.01); *G06Q 20/12* (2013.01); *G06Q 20/322* (2013.01);
(Continued)

(58) Field of Classification Search
CPC .. G06Q 30/0613; G06Q 20/12; G06Q 20/322; G06Q 20/3672; G06Q 20/385; G06Q 20/401
See application file for complete search history.

(56) References Cited

U.S. PATENT DOCUMENTS

| 8,639,621 | B1* | 1/2014 | Ellis | G06Q 30/0639 |
| | | | | 705/41 |
| 2011/0307710 | A1* | 12/2011 | McGuire | G06Q 20/382 |
| | | | | 726/9 |

(Continued)

FOREIGN PATENT DOCUMENTS

WO  WO 2014/127444  8/2014

OTHER PUBLICATIONS

Muller, Frank, and Frank Thiesing. "Social networking APIs for companies—An example of using the Facebook API for companies." 2011 International Conference on Computational Aspects of Social Networks (CASON). (Year: 2011).*
(Continued)

*Primary Examiner* — Matthew E Zimmerman
(74) *Attorney, Agent, or Firm* — Haynes & Boone, LLP

(57) ABSTRACT

An integration platform provides a third party channel products from a merchant, so that the third party channel may cause an opportunity to be presented to a user to purchase one of the products. In response to an indication of a user purchase, the integration platform transmits a purchase request to the electronic commerce platform to create an order for the purchase. The integration platform may create a payment for the purchase with the merchant's payment processor and transmit the payment to the payment processor, update the order with the merchant's electronic commerce platform with the payment information, update the status of the order to shipped, and capture payment information by communicating with the payment provider.

(Continued)

The merchant's electronic commerce platform may then update the order with the integration platform, which may notify the third party channel of the update so that update may be communicated to the user.

20 Claims, 23 Drawing Sheets

Related U.S. Application Data

(60) Provisional application No. 62/290,716, filed on Feb. 3, 2016, provisional application No. 62/252,686, filed on Nov. 9, 2015.

(51) Int. Cl.
| | | |
|---|---|---|
| G06Q 20/12 | (2012.01) | |
| G06Q 20/32 | (2012.01) | |
| G06Q 20/36 | (2012.01) | |
| G06Q 20/38 | (2012.01) | |
| G06Q 20/40 | (2012.01) | |

(52) U.S. Cl.
CPC ....... *G06Q 20/3672* (2013.01); *G06Q 20/385* (2013.01); *G06Q 20/401* (2013.01)

(56) References Cited

U.S. PATENT DOCUMENTS

| | | | |
|---|---|---|---|
| 2012/0005038 A1* | 1/2012 | Soman | G06Q 20/12 705/26.41 |
| 2012/0030047 A1* | 2/2012 | Fuentes | G06Q 20/326 705/26.1 |
| 2012/0095881 A1 | 4/2012 | Rothman | |
| 2012/0158589 A1 | 6/2012 | Katzin et al. | |
| 2012/0316992 A1* | 12/2012 | Oborne | G06Q 20/386 705/26.41 |
| 2013/0144785 A1 | 6/2013 | Karpenko | |
| 2013/0290203 A1* | 10/2013 | Purves | G06Q 20/12 705/319 |
| 2013/0346302 A1 | 12/2013 | Purves et al. | |
| 2014/0006129 A1 | 1/2014 | Heath | |
| 2014/0229270 A1* | 8/2014 | Rashwan | G06Q 30/0277 705/14.43 |

OTHER PUBLICATIONS

International Search Report dated Feb. 15, 2017 issued in related PCT App. No. PCT/US2016/061185 (2 pages).
International Written Opinion dated Feb. 15, 2017 issued in related PCT App. No. PCT/US2016/061185 (4 pages).

* cited by examiner

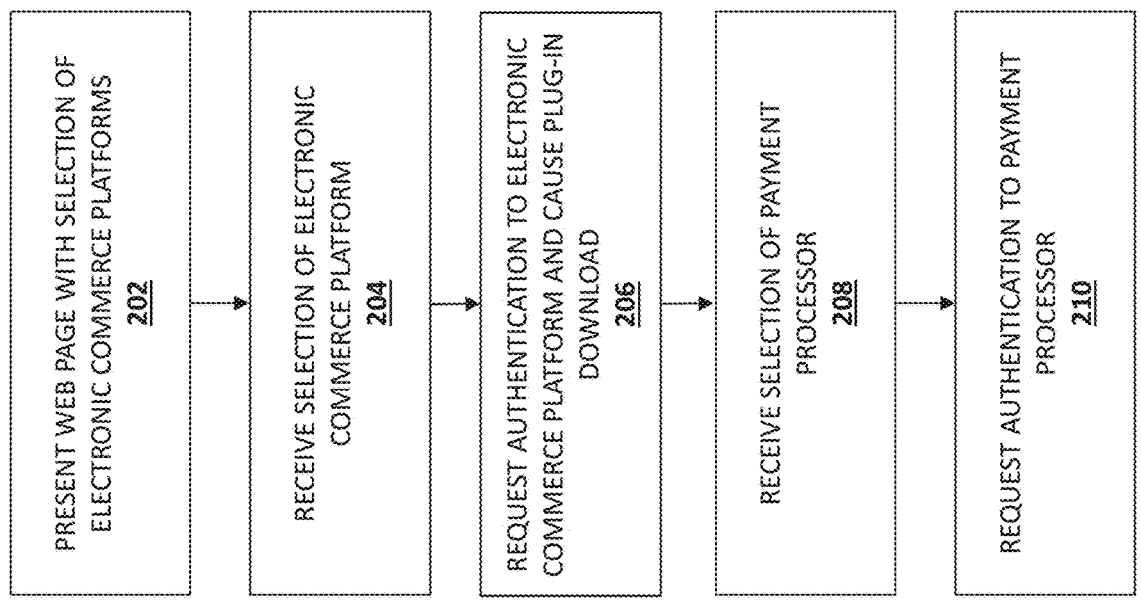

Integration Platform — T-Shirt Shop

Your Store
- Dashboard
- Orders
- Mobile
- Buy Buttons
- Platform
- Team
- Support
- Advanced

Welcome to the Integration Platform!

How do you want to sell with T-Shirt Shop?

Mobile SDK
Build your own native app or drop a store or buy button into an existing app.
[Get started]

Email Buy
Now your customers can buy products in one tap, right from their e-mail.
[Try it out]

Embedded Buy Buttons
Sell your products from any place of web content
[Learn more]

Start selling – just a few more steps before you can go live

- Add products — Import products from your electronic commerce platform or a product feed [Set up]
- Configure tax rates — Enter the location of your physical or business address [Set up]
- Connect your payment gateway — Use BRAINTREE®, PAYPAL®, or others to process payments [Set up]
- Set up shipping methods — Define the shipping methods and costs that apply to orders made in your store [Set up]

FIGURE 14

METHOD, MEDIUM, AND SYSTEM FOR AN INTEGRATION PLATFORM FOR INTERFACING WITH THIRD PARTY CHANNELS

CROSS REFERENCE TO RELATED APPLICATIONS

The present application is a continuation of and claims priority to U.S. patent application Ser. No. 15/346,274, filed Nov. 8, 2016, and claims priority to and incorporates by reference U.S. Provisional Patent Application Ser. No. 62/252,686, filed Nov. 9, 2015 and U.S. Provisional Patent Application Ser. No. 62/290,716, filed Feb. 3, 2016, all of which are incorporated herein in their entirety.

BACKGROUND

Field of the Invention

The present disclosure generally relates to systems and methods for providing interfaces to third party channels.

Related Art

More and more consumers are purchasing items and services over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile payment service provider. Such payment service providers can make transactions easier and safer for the parties involved. Purchasing with the assistance of a payment service provider from the convenience of virtually anywhere using a mobile device is one main reason why on-line and mobile purchases are growing very quickly.

Companies and merchants that wish to sell products to users of third party channels, such as social networking platforms, typically encounter difficulties in managing and configuring their electronic commerce platforms for use with multiple third party channels. Correspondingly, third party channels typically experience difficulties in configuring interactions and transactions with multiple electronic commerce platforms and payment providers and processors.

Thus, there is a need for an improved system and method for integrating merchants, electronic commerce platforms, payment processors, and third party channels.

BRIEF DESCRIPTION OF THE FIGURES

FIG. 2 is a flow chart illustrating an embodiment of a method for onboarding a merchant to an integration platform.

FIG. 14 is an example user interface display provided by an integration platform in accordance with one embodiment disclosed herein.

Figure 1:
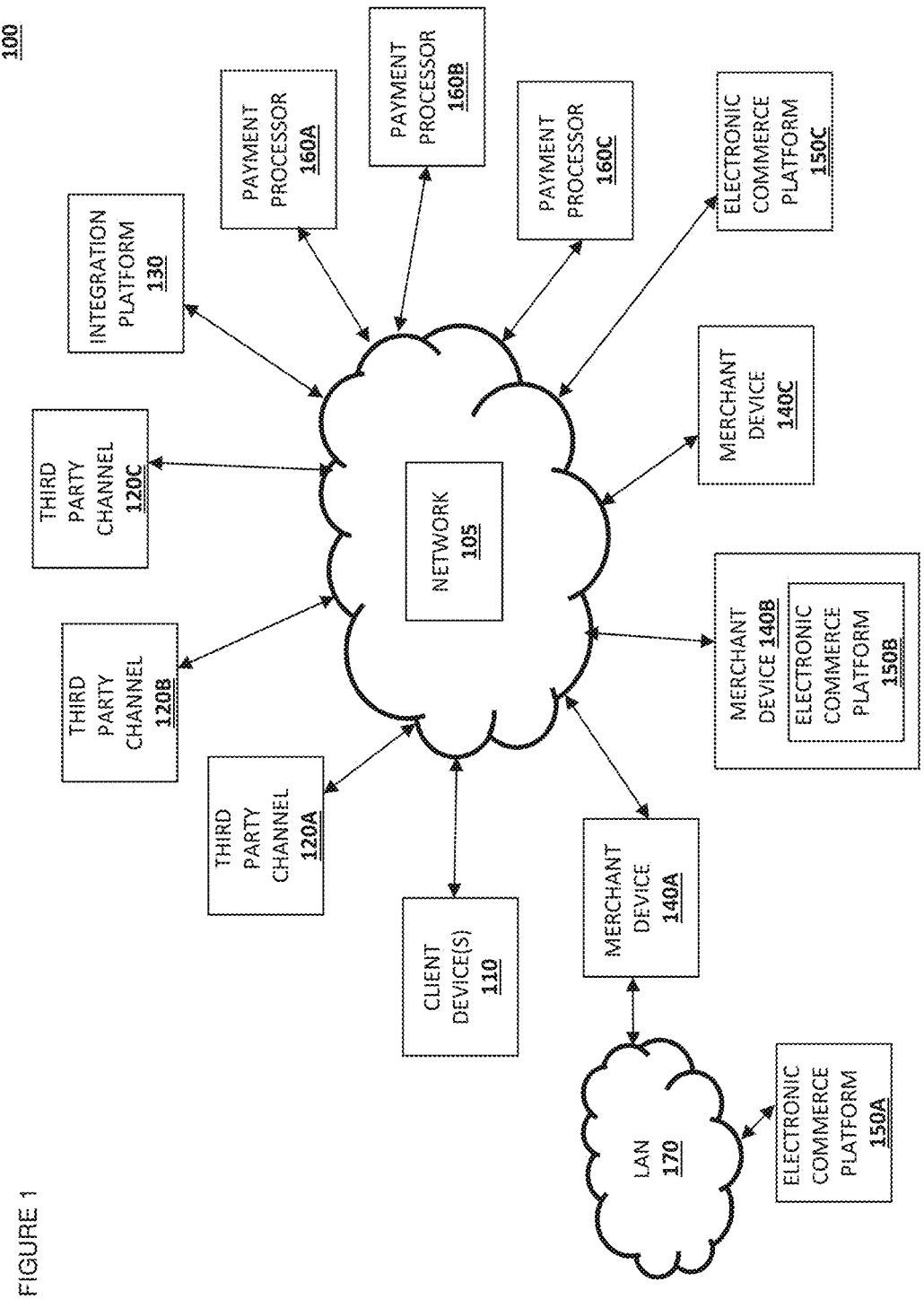
FIG. 1 is a schematic view illustrating an embodiment of a networked system.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for providing an integration platform which provides a standard interface to merchant electronic commerce platforms and third party channels which enables merchants to offer their products through the third party channels with a minimum of effort. In one embodiment, an integration platform provider provides a webpage for display to a merchant, which includes a selection of one or more electronic commerce platforms and one or more payment processors. Upon selection of an electronic commerce platform, the integration platform provider may present an authentication webpage for the electronic commerce platform, and receive input from the merchant which includes authentication details for the selected electronic commerce platform. Thereafter, upon selection of a payment processor, the integration platform provider may present an authentication webpage for the payment processor, and receive input from the merchant which includes authentication details for the selected payment processor. The integration platform may then receive one or more products for display on one or more third party channels from the merchant, including relevant marketing information for the products indicating characteristics or subsets of users to be presented with purchasing opportunities for the products. At a time when a user is browsing or using a third party channel, such as a social networking platform or website, the third party channel may receive, from the integration platform, the products from the merchant, along with the relevant marketing information, and cause an advertisement or other opportunity to purchase one of the received products to be displayed to user(s). In response to a selection of a purchase button or other user interface control, the integration platform may receive, from the third party channel, an indication of a user purchase. The integration platform may, in response, transmit a purchase request to the merchant's electronic commerce platform to create an order for the purchase. In addition, the integration platform, in response to the user purchase indication, may create a payment for the purchase with the merchant's payment processor and transmit the payment to the payment processor. The integration platform may also update the order with the merchant's electronic commerce platform with the payment information. At a later time, the merchant's electronic commerce platform may update the status of the order to shipped, and capture payment information by communicating with the payment provider. The merchant's electronic commerce platform may then update the order with the integration platform, which may in turn notify the third party channel of the update to the order, which can then be communicated to the user.

Though the popularity of electronic commerce increases every day, implementing seamless shopping experiences becomes more difficult as more online activities occur within applications executing on mobile devices as opposed to desktop computers with web browsers. In particular, purchasing products initially presented to a user in an advertisement may be relatively straightforward in a desktop web browser, but significantly more difficult when the advertisement is displayed in an application provided by a third party channel.

Electronic and online commerce for merchants selling goods directly to consumers involves many devices, parties, as well as certain core components, which may be provided by third party software packages, or electronic commerce platforms, purchased and deployed by a merchant. For example, certain third party electronic commerce platforms provide bundled software packages to provide a purchase user experience, manage the merchant's catalog and stock keeping unit (SKU) information, perform order management, and perform inventory management. Payment processing for purchases and other transactions may be provided by other third party payment processors, such as BRAINTREE®, a division of PAYPAL® Inc. of San Jose, Calif.

As the volume of electronic commerce transactions increases, merchants continually seek new customer acquisition channels. One such popular channel includes third party channels such as social networking platforms, retail aggregators, consumer platforms, and other platforms not directly associated with the merchant or not acting as a merchant of record for products featured on those channels. Thus, third party channels that wish to offer their users the opportunity to purchase products within the third party channel's applications or mobile websites may, as one option, use interfaces provided by electronic commerce platforms, large merchants, and payment processors, to enable purchases though the third party channel. However, this may be complex, as managing the different interfaces to the electronic commerce platforms and other systems of the various merchants requires special configuration for each electronic commerce platform's specific operation.

As another option, the third party channel may offer interfaces for each of the electronic commerce platforms, large merchants, and payment processors to interact with, but this requires cooperation from each of the third parties. Although referred to as third party channels herein, any online network with significant consumer adoption and an ambition of harvesting a retail intent of users through direct buying experiences may be used as an example third party channel or consumer platform wishing to allow users to purchase products through their platform. As explained above, direct e-mail messages to consumers, "buy" buttons placed on a website, and retail aggregators, may be examples of consumer platforms wishing to allow users to purchase products through their platforms.

A third option, in accordance with one or more embodiments described herein, is to use an integration platform, such as that offered by BRAINTREE®. Such an integration platform may offer one or more interfaces, such as one or more application programming interfaces (APIs), to connect with one or more consumer or third party channels, and to also connect with electronic commerce platforms, merchants, and payment processors. The APIs offered by the integration platform may standardize interactions between, for example, the third party channels and the electronic commerce platforms, such that a particular third party channel only needs to configure its systems once to interact with the integration platform, which in turn may serve much like a conduit to interact with any of the electronic commerce platforms which operate in conjunction with the integration platform. Likewise, the integration platform allows the merchant to use its electronic commerce platform with multiple different third party channels without needing to individually configure its electronic commerce platform to interact with the specific requirements of the differing third party channels.

Such an integration platform may also reduce or eliminate the need for the third party channel to interact with payment processors, as the merchant's electronic commerce platform, which is ordinarily already configured to work with the merchant's chosen payment processor, can still process payments using the payment processor. Alternatively, the integration platform may itself be configured to interact with the merchant's selected payment processor, and handle payments on behalf of the merchant. Similarly, the third party channel does not need to be concerned with the inner workings of the merchant's business, such as stocking information; the third party channel only needs to display the products for sale and allow the user to select the product for purchase. The integration platform then communicates the information to the merchant's electronic commerce platform and payment processor to complete the transaction. Additionally, the third party channel does not need to receive the merchant's entire catalog and all accompanying information. Instead, the third party channel only receives the necessary product data for the merchant, such as the product name, price, description, image, uniform resource locator (URL), marketing information, and other such data, but may not need to receive extraneous data that is only used internally by the merchant or the merchant's electronic commerce platform.

Other tools and services that operate in conjunction with the merchant's electronic commerce platform, such as inventory tracking tools, reporting tools, order fulfillment tools, and other back office workflows and tools. Thus, such an integration platform minimizes the impact on a merchant's existing workflows, and allows a merchant to sell on multiple channels or platforms and increase its reach without significant effort. For electronic commerce platforms, operation with an integration platform may empower the platform to deliver more value to users, connect brands and consumers and create rich relationships, diversify monetization models, and simplify the electronic commerce platform's engineering investment in integrating with merchants.

Additionally, such an integration platform may allow merchants to offer their products on multiple third party channels or websites quickly and with minimal effort, allowing the merchant to be onboarded to the integration platform and thus offering products on third party channels quickly.

Referring now to FIG. 1, an embodiment of a networked system 100 is illustrated. As described above, electronic commerce involves a multitude of devices and parties connected to a network. As shown, networked system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the devices, platforms, and servers illustrated in FIG. 1 may be deployed in other ways and that the operations performed and/or the services provided by such servers may be combined or separated for a given implementation and may be performed by a greater number or fewer number of servers. One or more devices, platforms, and servers may be operated and/or maintained by the same or different entities.

The networked system 100 includes multiple devices that are coupled to a network 105, which may include the Internet or another wide area network. For example, the networked system 100 includes one or more client devices 110, which may include, for example, mobile devices, desktop computers, tablet computers, laptop computers, and the like. Also coupled to network 105 are one or more third party channels 120A-120C, which may operate on one or more servers. Third party channels may include, for example, social network websites and services that offer mobile applications to users to access the social networking platform from a mobile or tablet device. Additionally, the networked system 100 includes an integration platform 130 connected to network 105, as will be further described herein.

Networked system 100 further includes a plurality of merchants operating merchant devices 140A-140C, which may also operate on one or more servers. Merchant devices 140A-140C may be used by any type of merchant offering their goods to purchasers online, and may include merchants wishing to offer their goods to users of third party channels 120A-120C. Each merchant device 140A-140C may be associated with a respective electronic commerce platform 150A-150C, as further described herein. Depending on the particular merchant, a merchant may host an electronic commerce platform, connected to its merchant device via its own internal network or local area network 170, such as the electronic commerce platform 150A coupled to merchant device 140A via LAN 170. A merchant may also operate an electronic commerce platform 150B on its own merchant device 140B. Additionally, a merchant may use an electronic commerce platform 150C via the network 105, as in the case of merchant 140C.

Networked system 100 further includes a plurality of payment processors 160A-160C, connected to network 105. Such payment processors may include credit card processors and other similar parties. In one embodiment, the integration platform 130 may be part of a payment processor 160. One such payment processor 160 may be operated by a payment service provider such as, for example, PAYPAL® Inc. of San Jose, Calif.

Figure 3A:
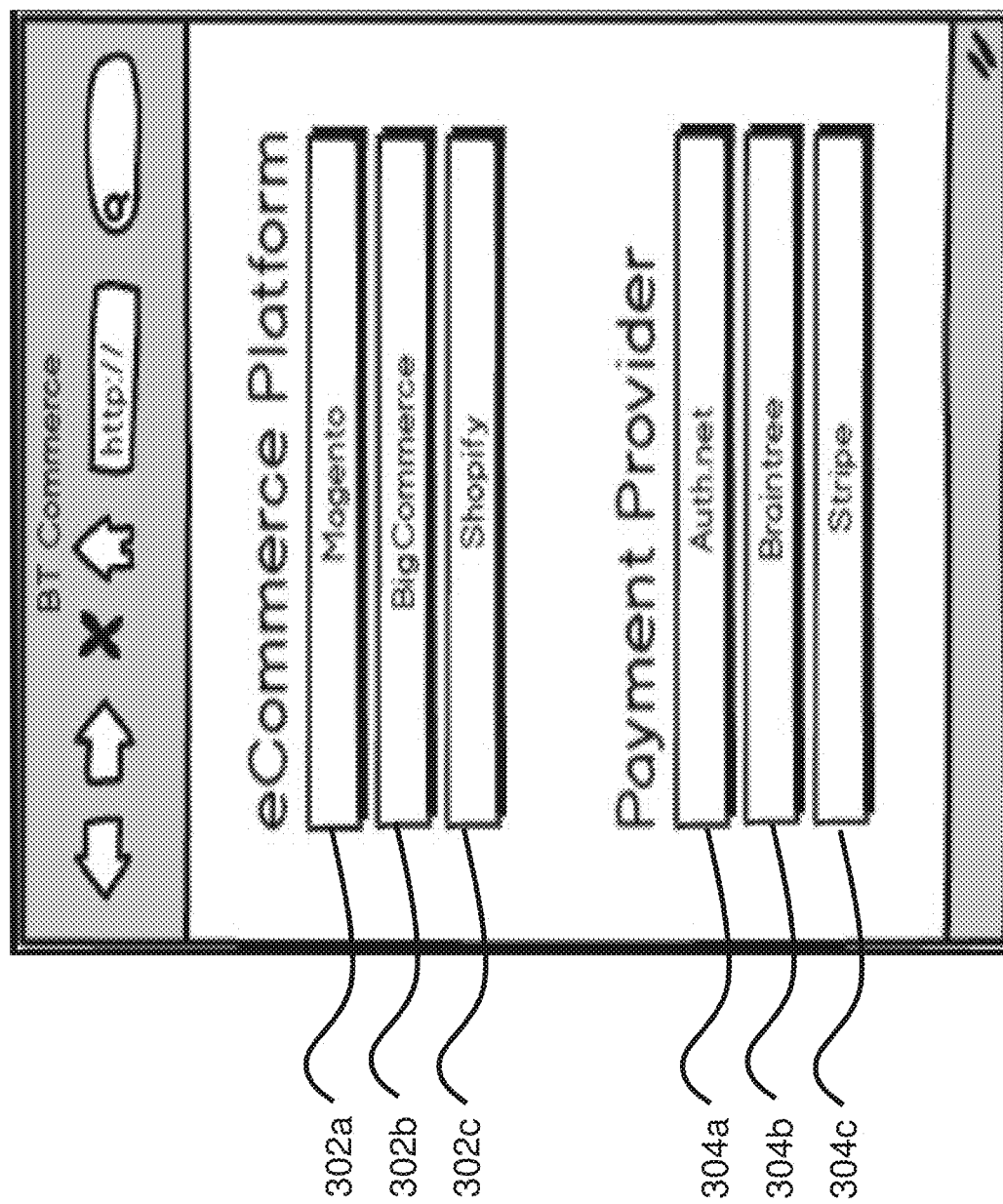
FIGS. 3a-3h are exemplary user interface illustrations depicting a method for onboarding a merchant to an integration platform.

In one embodiment, the onboarding process for a merchant may include connecting the merchant's selected electronic commerce platform and the merchant's selected payment provider. FIG. 2 is a flow diagram of a method 200 for onboarding a merchant to an integration platform. At step 202 of method 200, an integration platform may present the merchant with a web page with a menu or other presentation which permits the merchant to select from a variety of electronic commerce platforms 302a-302c which the merchant may use, as shown in FIG. 3a.

Method 200 then continues to step 204. At step 204, the integration platform may receive a selection of an electronic commerce platform from the merchant. Method 200 then continues to step 206, where the integration platform requests authentication to the electronic commerce platform.

Figure 3B:
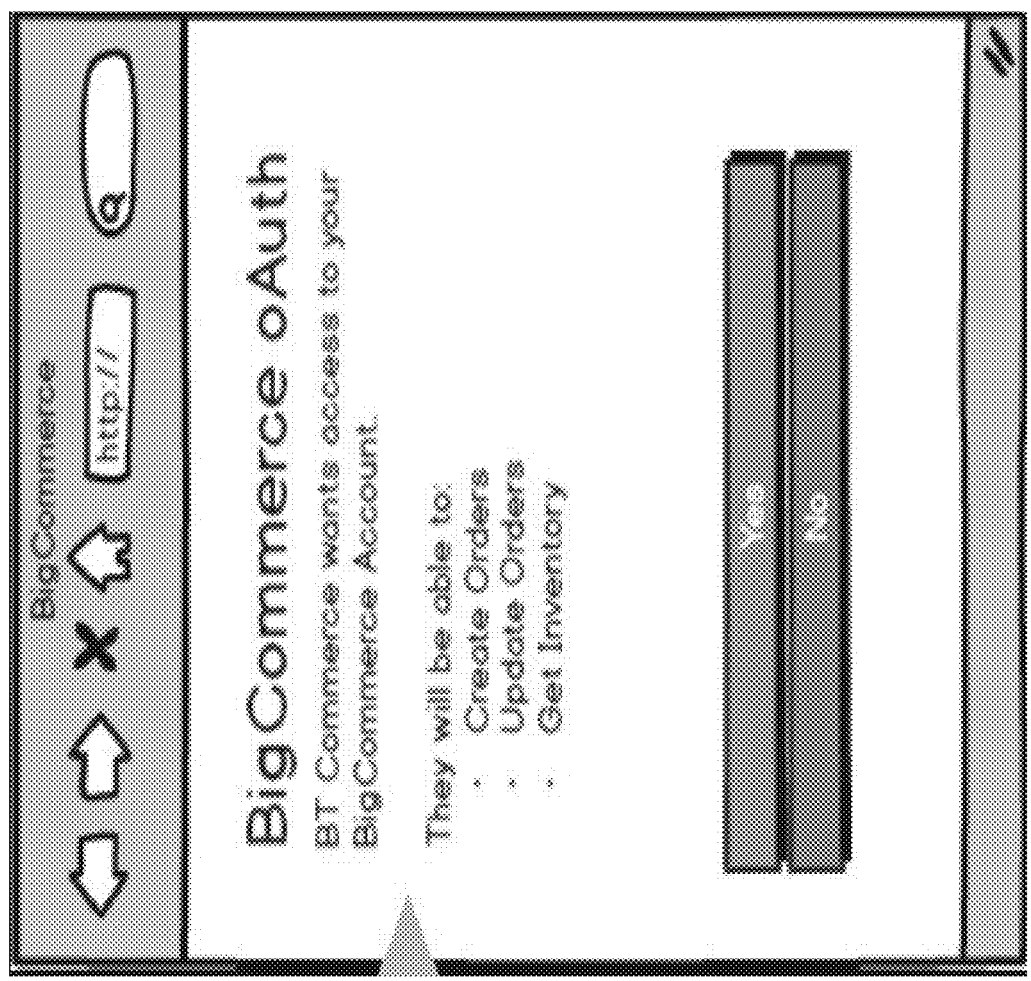

Referring to FIG. 3b, upon selection of one of the electronic commerce platforms 302, the merchant may be presented with an authorization page, such as the authorization page shown in FIG. 3b. In one embodiment, the authorization page may request that the merchant grant the integration platform access to the merchant's electronic commerce platform. Depending on the electronic commerce platform used by the merchant, this may be accomplished using an authorization standard such as oAuth, in which an access token is issued to the integration platform upon approval by the merchant. Thus, for example, the authorization page shown in FIG. 3b may request access to the merchant's electronic commerce platform, and inform the merchant of the permissions requested by the integration platform. Upon selecting the "Yes" button, the integration platform may obtain access to the merchant's electronic commerce platform.

Figure 3C:
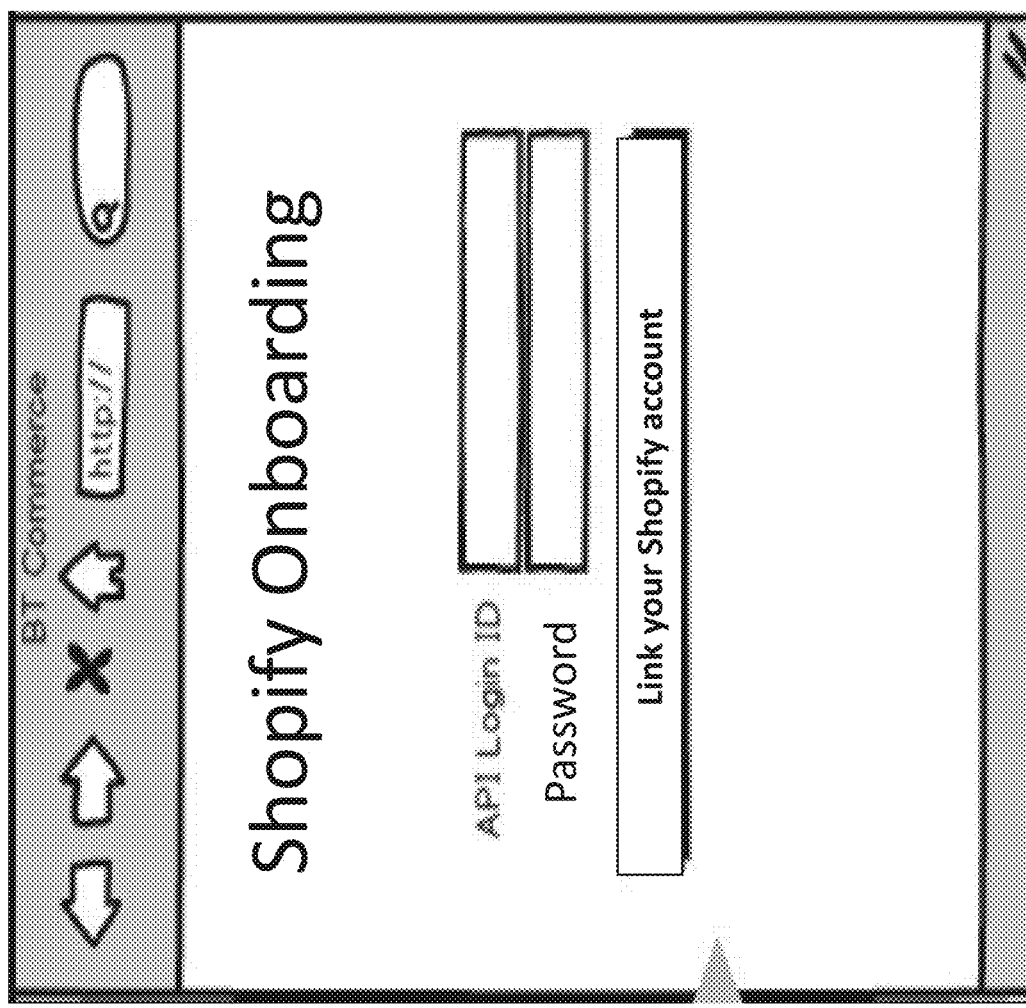

In one embodiment, if oAuth or a similar authorization standard is not used, the merchant may be presented with a screen such as that shown in FIG. 3c. In FIG. 3c, the merchant may be requested to enter in a username and password, or other authentication details, such as an API login and password, for the merchant's electronic commerce platform. The integration platform may utilize the authentication details to access the electronic commerce platform, as described herein.

Figure 3D:
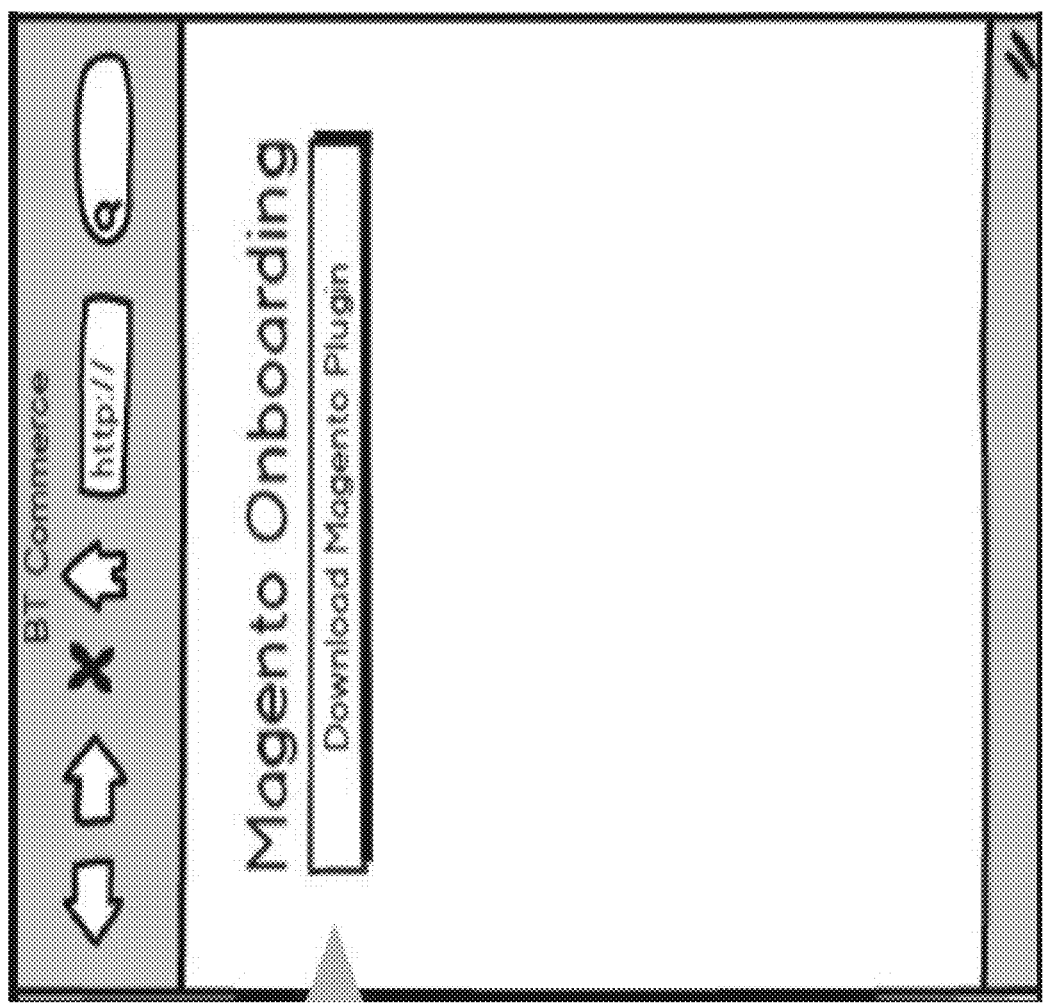
Figure 3E:
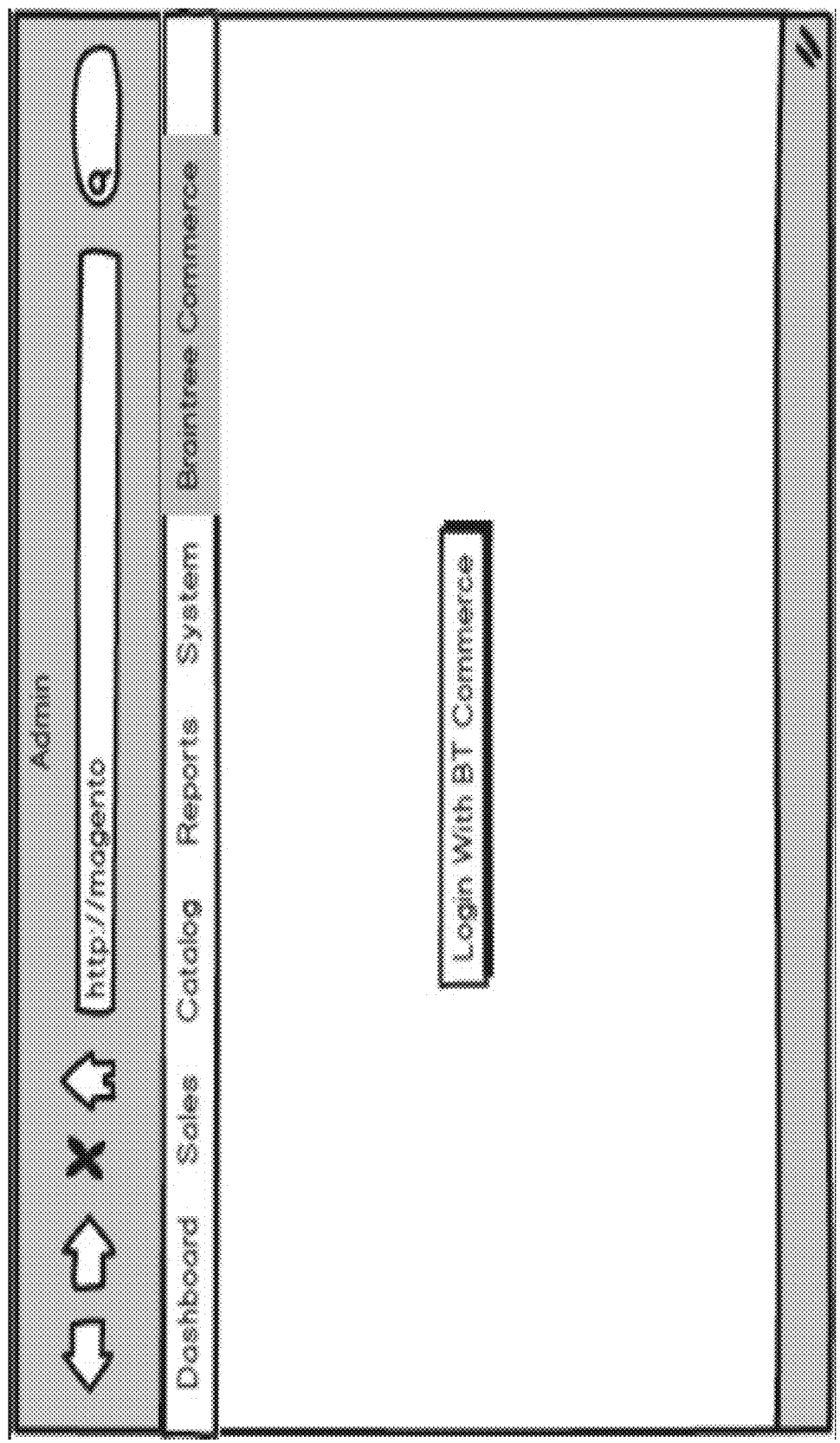

In a further embodiment, depending on the electronic commerce platform used by the merchant, the merchant may be requested to download a plug-in (e.g., a software plug-in) provided by the integration platform to permit access to the merchant's electronic commerce platform, and may be presented with a screen such as that shown in FIG. 3d. Once the plug-in is installed, the integration platform may access the merchant's electronic commerce platform. In one embodiment, the plug-in may allow the merchant to customize aspects of the interactions with the integration platform. For example, the plug-in may customize which products the merchant would like to offer through the integration platform, target customer details for the merchant's products, incentive information for the products, catalog update frequency, and other such customizations. In one embodiment, once the merchant authenticates the integration platform with the electronic commerce platform, a plug-in may automatically be installed in the merchant's electronic commerce platform. In a further embodiment, the plug-in may automatically be configured with access information for the merchant's electronic commerce platform. In one embodiment, upon activation of the plug-in, the plug-in may request authentication credentials with the integration platform, to allow transactions to occur using the integration platform as the interface or conduit to the electronic commerce platform. In such an embodiment, the merchant may be presented with a screen such as that shown in FIG. 3e, which requests that the user then log in with the integration platform.

Figure 3F:
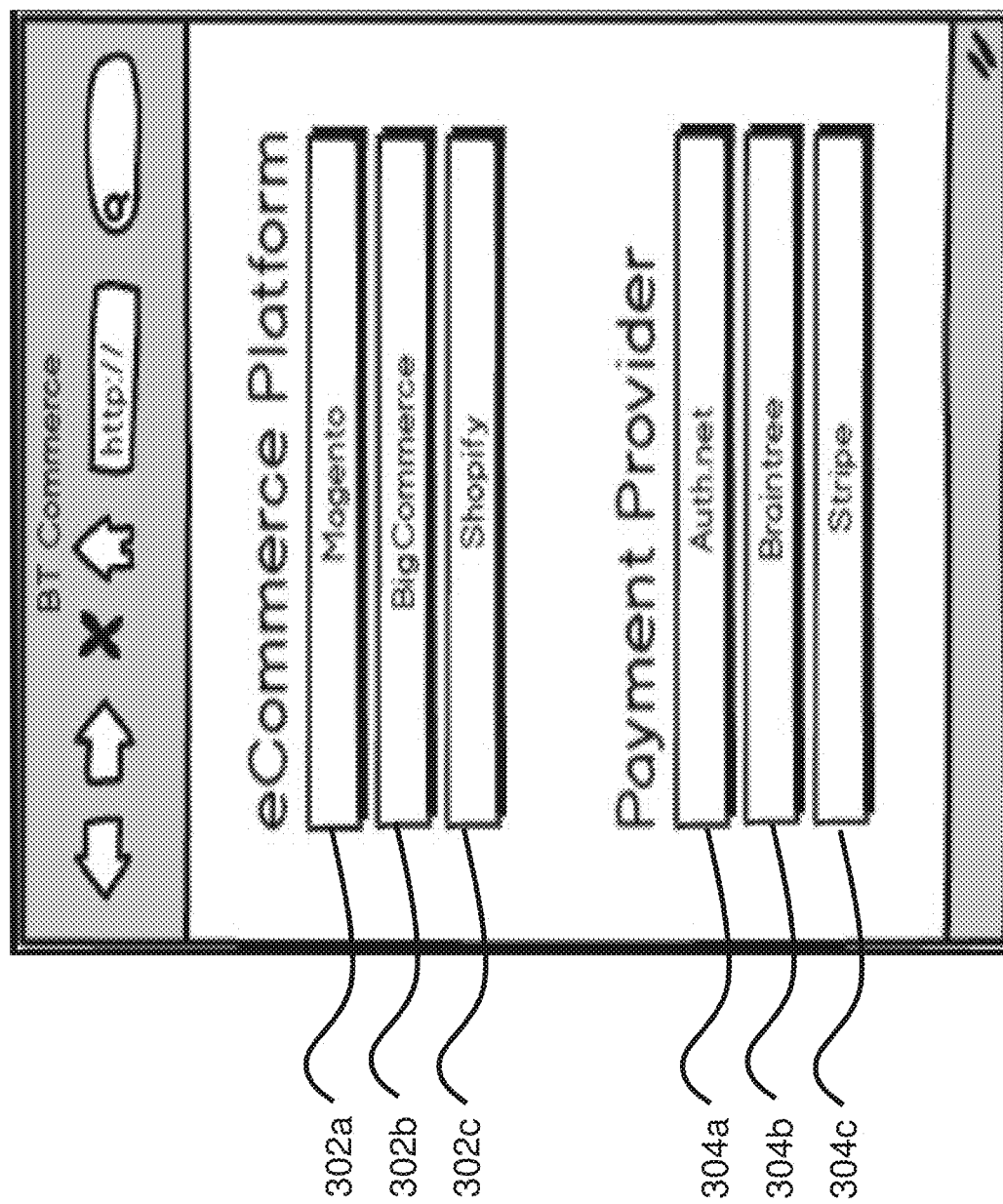
Figure 3G:
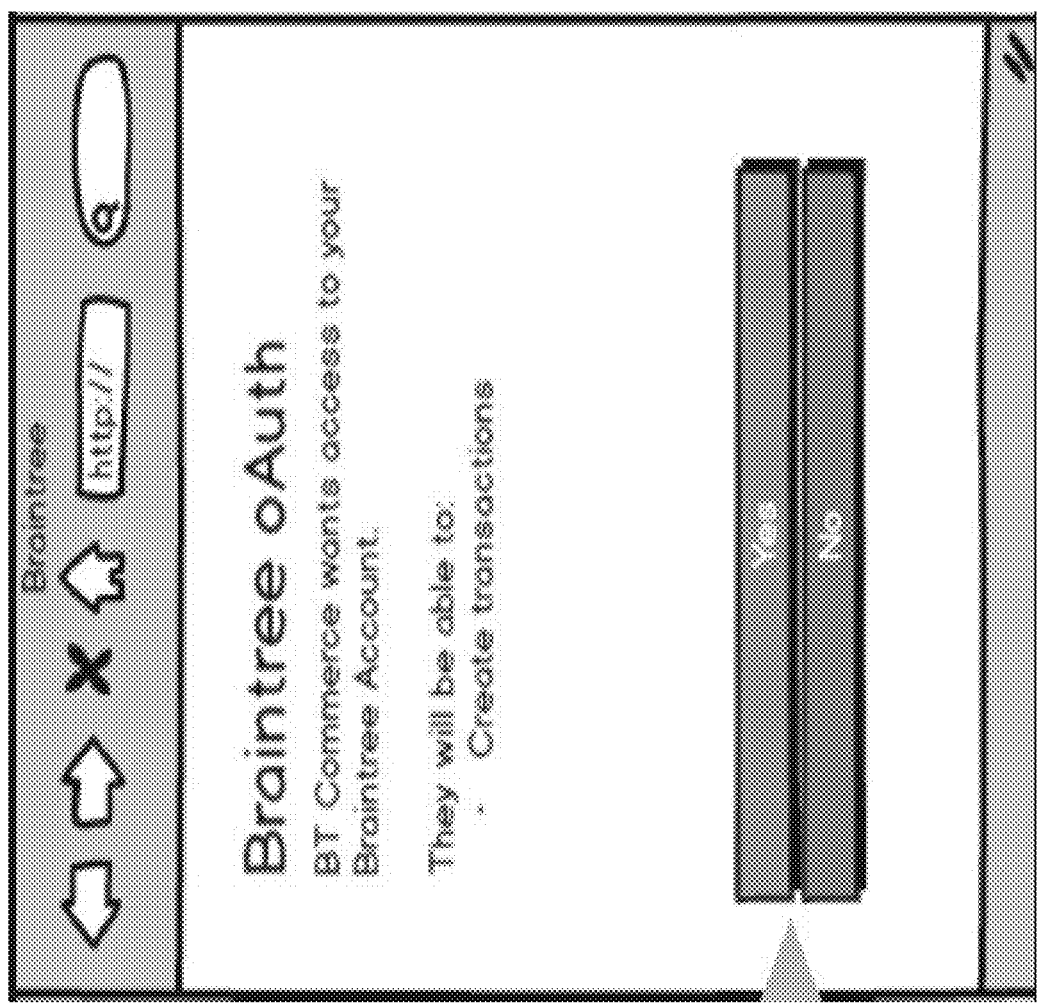

Method 200 then proceeds to step 208. As described above, the integration platform also serves as an interface to a merchant's payment processor. At step 208, the integration platform receives a selection of a merchant's payment processor. Thus, in one embodiment, like the interface to the merchant's electronic commerce platform, the merchant may be presented with a web page with a menu or other presentation which permits the merchant to select from a variety of payment processing providers which the merchant may use, as shown in FIG. 3f. Upon selection of one of the payment processing providers 304a-304c, the merchant may be presented with an authorization page, such as the authorization page shown in FIG. 3g. In one embodiment, the authorization page may request that the merchant grant the integration platform access to the merchant's payment processing providers. Depending on the payment processing provider used by the merchant, this may be accomplished using an authorization standard such as oAuth, in which an access token is issued to the integration platform upon approval by the merchant. Thus, for example, the authorization page shown in FIG. 3g may request access to the merchant's payment processing provider, and inform the merchant of the permissions requested by the integration platform. Upon selecting the "Yes" button, the integration platform may obtain access to the merchant's payment processing provider.

Figure 3H:
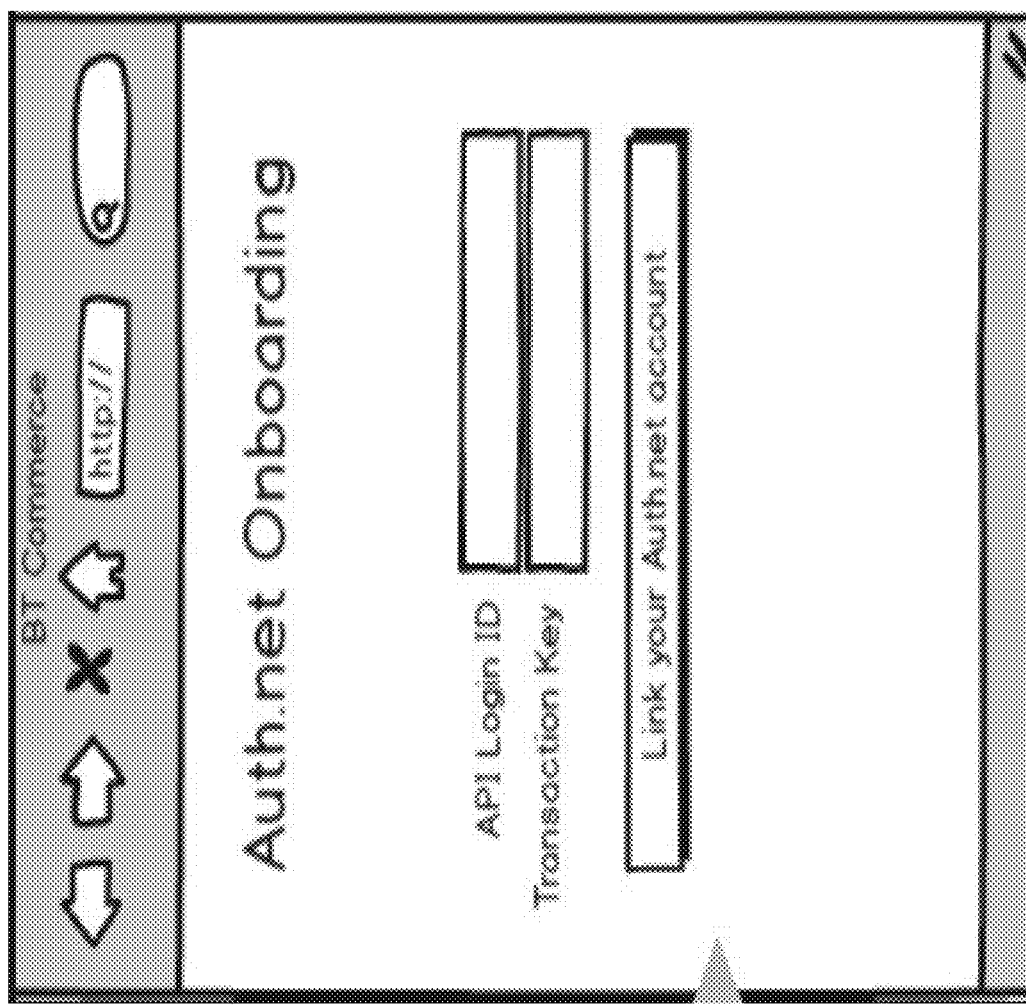

As also described above, in one embodiment, if oAuth or a similar authorization standard is not used, the merchant may be presented with a screen such as that shown in FIG. 3h. In FIG. 3h, the merchant may be requested to enter in a username and password, or other authentication details, such as an API login identification and a transaction key, for the merchant's payment processor. The integration platform may utilize the authentication details to access the payment processing provider, as described herein.

At the completion of method 200, the merchant is onboarded onto the integration platform, and can then offer products to users of third party channels through the integration platform.

Figure 4A:
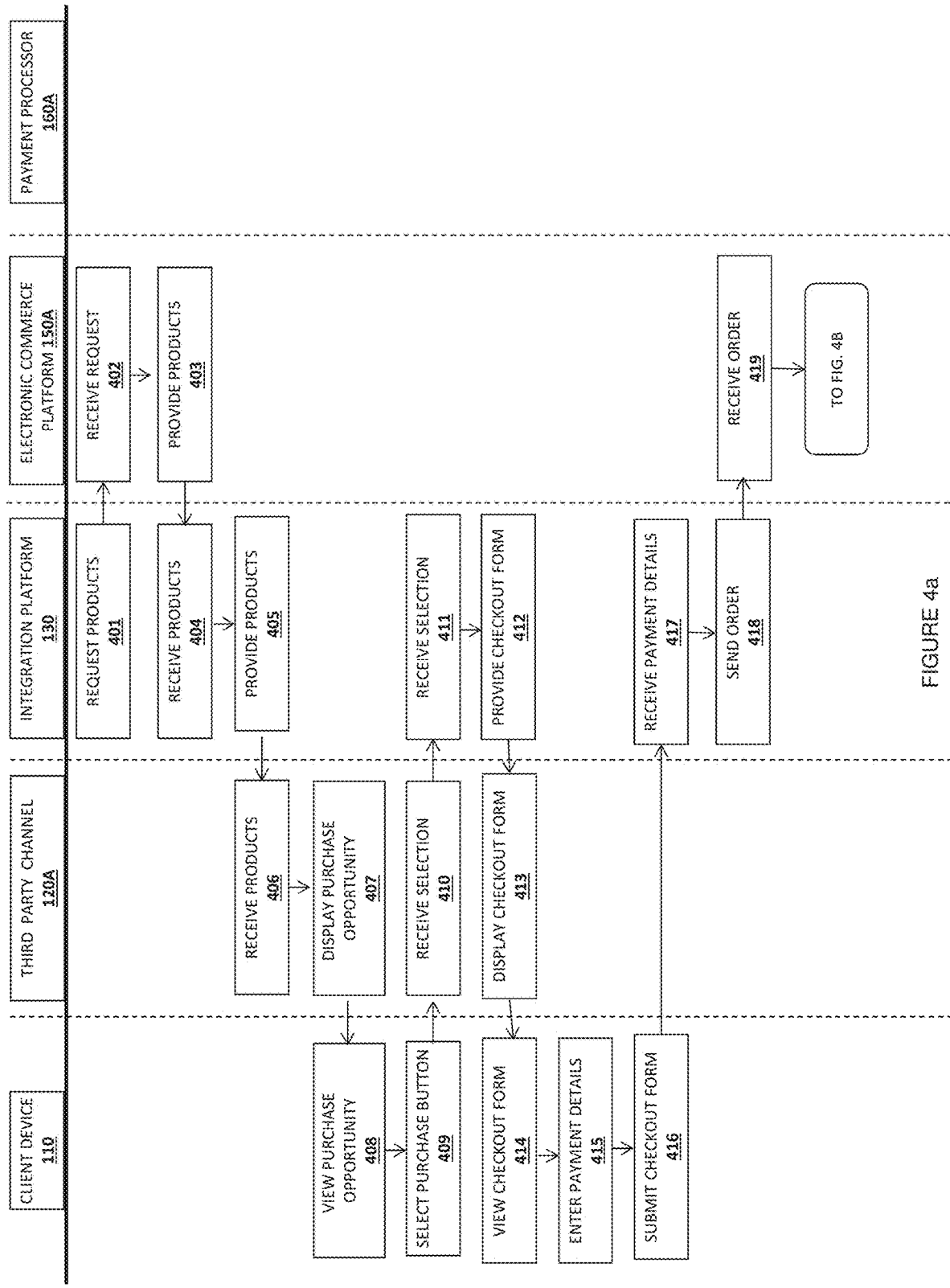
FIGS. 4a-4b are swim lane sequence diagrams illustrating an example of a third party channel user purchasing a product from a merchant using an integration platform.

FIG. 4 is a sequence diagram 400 depicting the events that may occur and the steps taken by each of the integration platform 130, a merchant's electronic commerce platform 150A, a payment processor 160A, a third party channel 120A, and the user utilizing client device 110, once the merchant is onboarded onto the integration platform, for example, with reference to method 200 of FIG. 2. In one embodiment, certain steps may be performed by an integration platform application or plug-in executed by a third party channel or other website provider which uses the integration platform to connect with merchants wishing to offer their products to users of, for example, the third party channel.

At step 401 of the sequence diagram, after a merchant has authorized the integration platform, the integration platform may request products offered by the merchant's electronic commerce platform. At step 402, the electronic commerce platform receives the request, and at step 403, provides the products to the integration platform, which receives the products at step 404. At step 405, the integration platform may transmit the received products to the third party channel 120A, which receives the products at step 406.

In one embodiment, all products offered by the merchant may be received. In one embodiment, the merchant or the integration platform may select a subset of products to be offered, for example, products likely to be purchased by third party channel users or products intended for a particular event (e.g., Halloween costumes). In one embodiment, the products are retrieved in response to a request from a third party channel operating in conjunction with the integration platform to offer the merchant's goods for sale. In one embodiment, updates to the products are retrieved periodically from the merchant, such as on a daily or hourly basis. In a further embodiment, the merchant's electronic commerce platform may communicate a product update to the integration platform, which in turn communicates a product update to the third party channel.

At step 407 of the sequence diagram, the user may be browsing the third party channel, for example, using client device 110 executing an application provided by the third party channel, which may be a portable or mobile phone having a touch screen input device, and may be presented with an advertisement or other opportunity to purchase a product within the application, which is viewed at step 408. The advertisement or other opportunity may be generated or provided by the integration platform, and displayed within the third party channel's application. In one embodiment, the advertisement or other opportunity is generated by the merchant's electronic commerce platform and provided through the integration platform. In one embodiment, the third party channel or other entity targets the user with opportunities to purchase products relevant to the user's interests, based on the user's profile with the third party channel, e.g., the user's social networking profile or other information.

At step 409 of the sequence diagram, the user may select a buy button or make another indication that he or she would like to purchase the displayed product. For example, the user may select a buy button using the touch screen input device of the client device 110. At step 410, the third party channel 120A receives the user's selection of the purchase button, which is in turn communicated to the integration platform.

In response to the receipt of the user's selection of a buy button, at step 411 of the sequence diagram, the integration platform may provide to the user, via the third party channel (step 412), a checkout form for entry of the user's payment details, which is viewed at step 413. In one embodiment, certain payment details may be retrieved from the user's profile with the third party channel, or may be accessed from the user's account with a payment services provider. Once the user has entered the payment details for the purchase at step 414, at step 415 then, the user submits the form, in one example, using a submit button or other user interface control.

Continuing to step 416 of the sequence diagram, the integration platform may receive the payment details (which may be initially transmitted to the third party channel and then to the integration platform), and in response, at step 417, create an order for the merchant's electronic commerce platform and transmit the created order (step 418) to the merchant's electronic commerce platform, which is received at step 419. In one embodiment, the integration platform creates an order for the merchant's electronic commerce platform using an API for the merchant's electronic commerce platform, a plug-in for the merchant's electronic commerce platform, or some combination thereof.

Figure 4B:
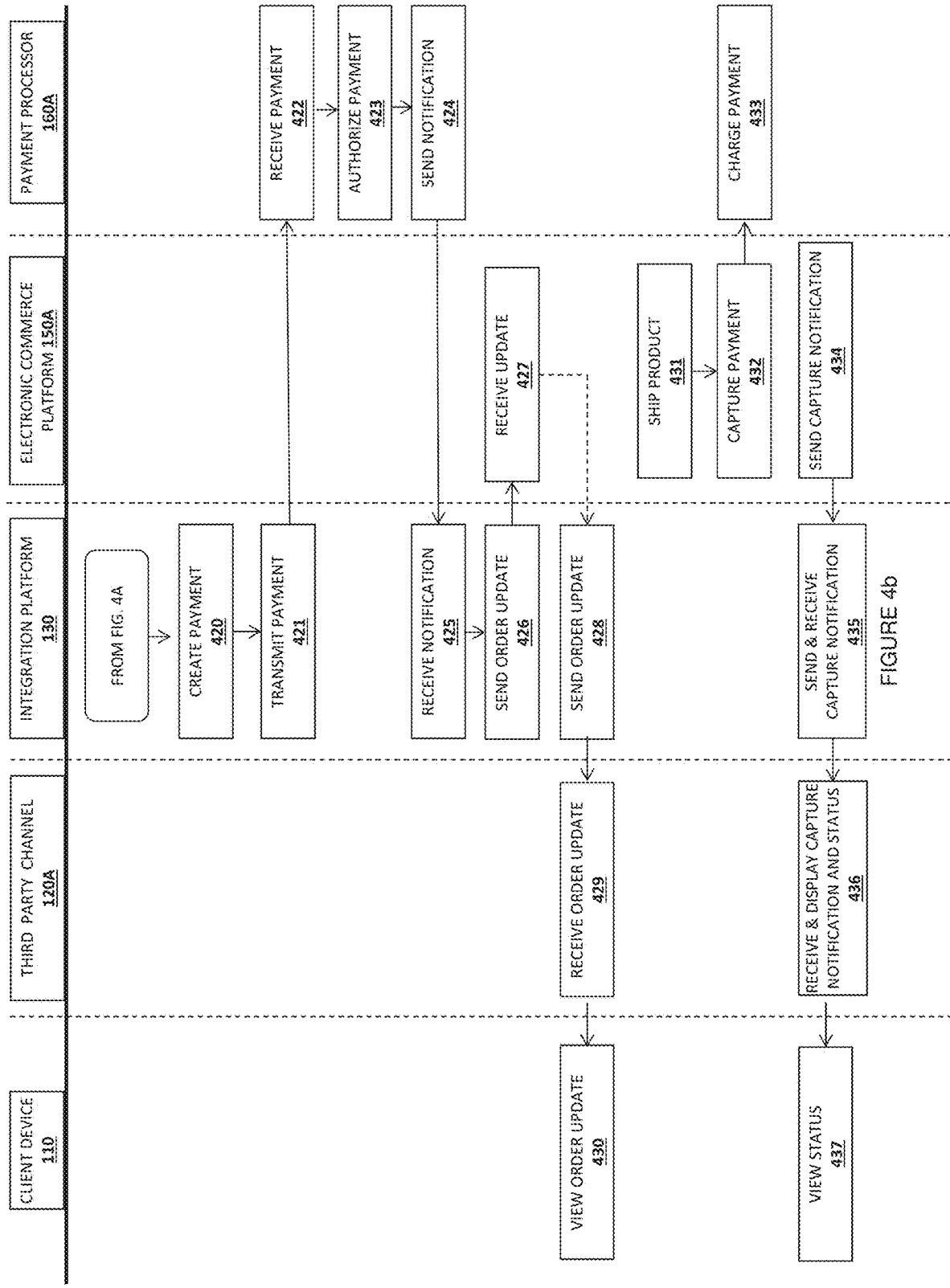

The sequence diagram continues to FIG. 4b. Continuing to step 420 of the sequence diagram, the integration platform may create a payment for the goods, using the merchant's selected payment processor, and transmit the created payment to a payment processor (step 421), such as PAYPAL®, or another payment processor such as a credit card processor, such as BRAINTREE®, or another such payment processor, for a payment authorization (the payment may not be completed at this point, as the goods have not yet been shipped, but the merchant may want to ensure that the user has sufficient funds to pay for the purchase). The payment is received at step 422. In one embodiment, the payment information is tokenized such that the user's personal account number (i.e., credit card number) is not transmitted, but rather, a unique token which can be used to retrieve the user's payment details is transmitted. In one embodiment, the integration platform uses an API provided by the merchant's payment processor to create the payment for the user's order.

Upon a successful payment authorization at step 423, the payment processor may send notification at step 424, the integration platform may receive an indication of the payment creation at step 425, and the integration platform may update the order (step 426) at the electronic commerce platform with the indication of the successful payment authorization. Thus, at step 427 of the sequence diagram, once the integration platform submits and updates the order for the merchant's electronic commerce platform with the successful payment authorization, the merchant's electronic commerce platform may update an order status for the purchase to "in progress," or another similar status. The merchant's electronic commerce platform may transmit this status to the integration platform. The integration platform may then transmit an updated status for the order to the third party channel at step 428, received at step 429, so that the user can view at step 430 the status of his or her order placed on the third party channel website or within the application provided by the third party channel. In one embodiment, the merchant's electronic commerce platform may send the user an indication, such as an e-mail, updating the user of the status of his or her order.

Continuing to step 431, the merchant's electronic commerce platform may ship the product, and capture the payment for the product, which may involve further interaction with the merchant's payment provider at step 432, causing a charge to the user's payment method at step 433. In one embodiment, the notification of shipment is transmitted to the integration platform, which causes the charge to the user's payment method. Upon a successful payment by the payment provider, the order status may be updated to "shipped" or a similar status by the electronic commerce platform, which may in turn be transmitted to the integration platform. The electronic commerce platform may send a capture notification at step 434, and the integration platform, after receiving an indication of the charge at step 435, may then transmit such an indication to the third party channel at step 436, so that the user can view the status of the shipped order at step 437.

Figure 5:
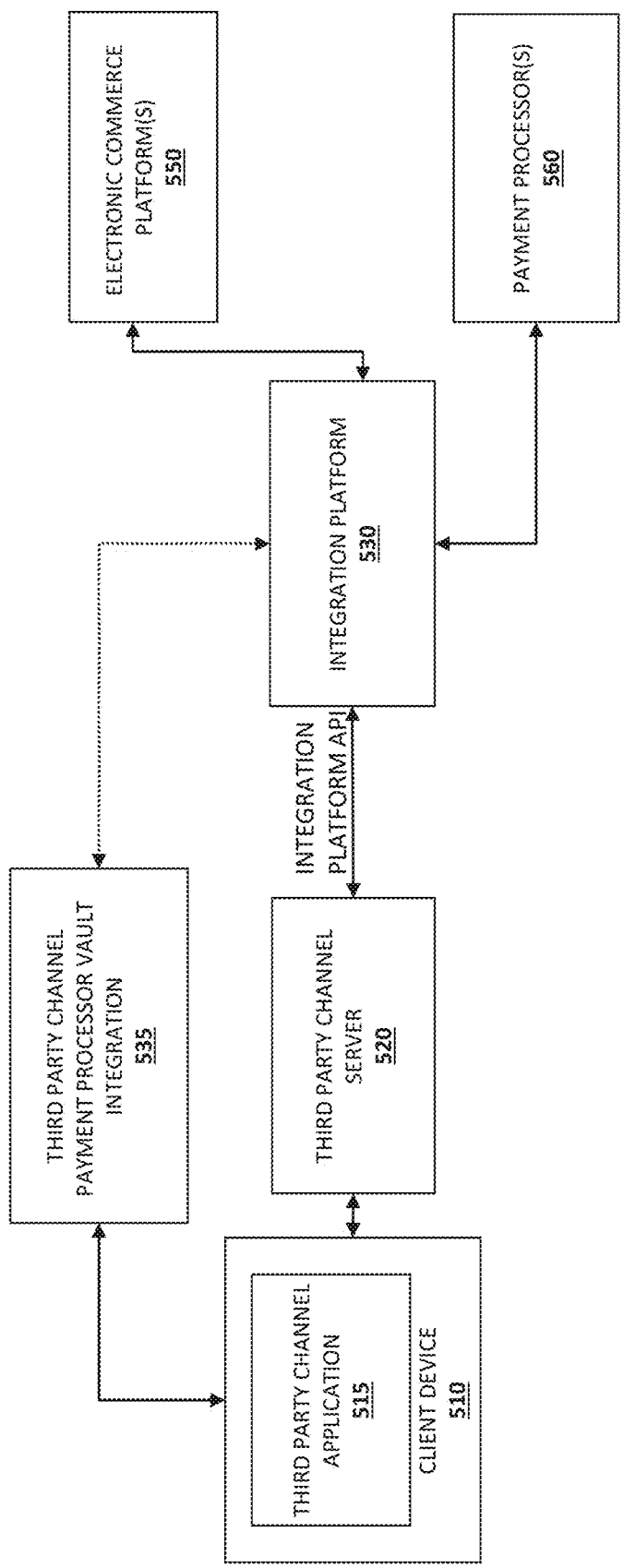
FIG. 5 is a schematic view illustrating an embodiment of a networked system.

Referring now to FIG. 5, an embodiment of a networked system 500 is illustrated. Networked system 500 may be similar in some respects to networked system 100; however, networked system 500 depicts a particular arrangement of the devices in networked system 100. Alternative arrangements, intermediate devices, and other variations are contemplated and within the scope of the instant disclosure.

Networked system 500 includes a client device 510 executing, in one embodiment, a third party channel application 515. Third party channel application 515 communicates with a third party channel server 520. Third party channel application 515 may also communicate with a payment processor vault integration for the third party channel 535 which securely stores user payment details, in compliance with regulatory and industry standards such as PCI/DSS. Payment processor vault integration 535 may also communicate with the integration platform 530 to transmit payment details for an order, as is described herein.

Networked system 500 further includes an integration platform 530, as described further herein. In some embodiments, Third party channel server 520 communicates with integration platform 530 using the integration platform API as described herein. Networked system 500 also includes one or more electronic commerce platforms 550 and one or more payment processors 560, each of which is in communication with integration platform 530 to facilitate purchasing of products as described herein.

In one embodiment, the merchant, using the merchant's electronic commerce platform, may group together multiple orders placed on the third party channel within a time window, such as 4 hours, such that one payment transaction is generated for the entire window, and one (or fewer than the number of orders) shipment is created for the set of orders.

In one embodiment, the integration platform may assist in network tokenization of the user's credit card or other payment details. Network tokenization may allow consumers and users to register their payment cards with a mobile wallet or online store, and replace the user's actual card number with a payment token number which can be used anywhere credit cards are accepted. Such tokenization provides consumers and users with increased protection against counterfeiting, account misuse, and other forms of fraud. Also, tokenization provides merchants, users, and payment providers the flexibility to utilize different payment token numbers per merchant or even per transaction. Upon creation of a payment by the integration platform, the integration platform may tokenize the payment details, such as the user's credit card number, before transmission to the payment provider. The payment provider may then translate the tokenized payment details back to the user's credit card number to process the payment with the credit card issuing bank or other financial institution.

In one embodiment, BRAINTREE®, PAYPAL® or other payment processors may be used as token service providers, which may allow third parties to create transactions with a third party channel's users payment methods, without having direct access to the user's credentials. In one embodiment, tokenization occurs using a POST request to a tokenization service provider to tokenize a primary account number (e.g., a credit card number). The request may include a merchant identification for a merchant vault to be accessed, a payment method nonce for a payment instrument being tokenized, a payment method token of the payment instrument being tokenized, the maximum amount a primary account number can be charged, and a currency code the maximum amount should apply to (e.g., USD, JPY, etc.). The request may also include the expiration date and card security code (e.g., CVV) for the primary account number. The response to the request may include a tokenized primary account number, along with a card security code and expiration date for the tokenized primary account number. Errors may occur when attempting to tokenize a payment instrument that cannot be tokenized, or if a tokenization failure occurs.

In one embodiment, network tokenization may involve a sequence of operations between a third party channel, payment processor (in one example, BRAINTREE®), tokenization provider (in one example, PAYPAL®), and a merchant. The third party channel may request that the payment processor vault a particular user's payment method (e.g., credit card). In response, the payment processor may send the third party channel a payment method token. The third party channel may then send the token, and request a tokenized card to be sent. The payment processor, upon receiving the token and request, itself requests a network tokenized card from the tokenization provider, which sends back the network tokenized card. The payment processor may then send the network tokenized card to the merchant, which processes the network tokenized card, and sends the payment processor a response. The response is then passed to the third party channel.

Figure 6:
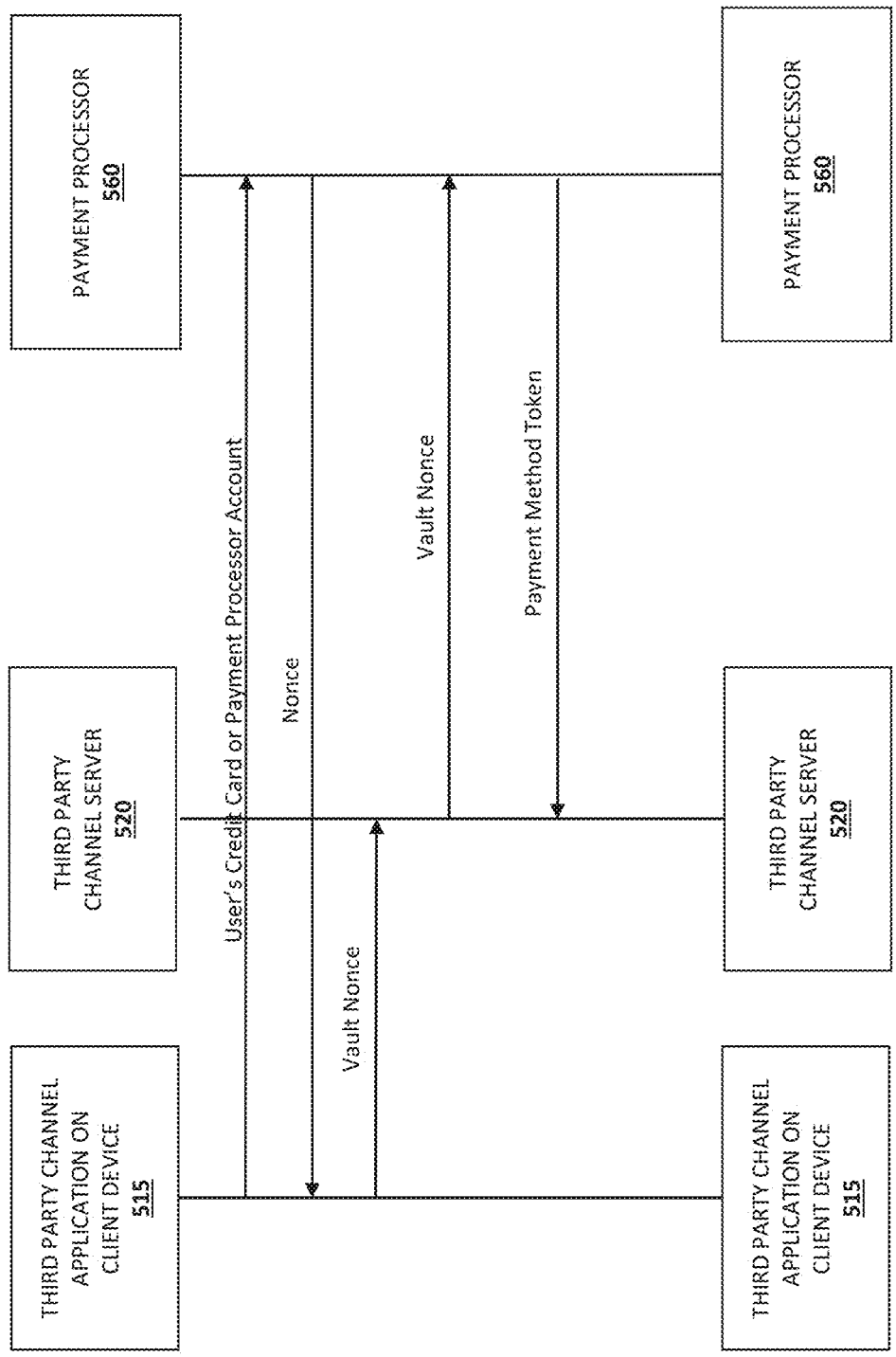
FIG. 6 is a flow diagram illustrating a sequence of operations between multiple computing devices.

In one embodiment, network tokenization may involve a sequence of operations between a third party channel application executing on a client device, a third party channel server, and a payment processor (e.g., BRAINTREE®), as depicted with reference to FIG. 6. The third party channel application executing on the client device may transmit credit card or payment processor account details to the payment processor, which in turn may respond with a nonce to the application. A nonce may represent, for example, a type of payment method (e.g., credit card, PayPal account, Bitcoin account, other cryptocurrency account, etc.). The application may request that the third party channel server vault the nonce; in response, the third party channel server may transmit the request to vault the nonce to the payment processor. Upon successful vaulting of the nonce, the payment processor may provide the third party channel server with a payment method token which may be used for purchasing products by the user.

In one embodiment, details of a payment method in a vault with the payment processor (e.g., BRAINTREE®) can be forwarded to an end-point using a POST request. Parameters in the request may include a configuration parameter to specify configuration settings, a list of values made available to transformation as global values (in a data field), a debug transformations field to prevent requests from being sent upstream, a merchant identification of a merchant whose vault is to be accessed, a method field to identify an HTTP method to be used, an endpoint name for receiving the card information, a payment method nonce of the payment instrument being forwarded, a payment method token of the payment instrument being forwarded, a list of sensitive data values that are made available to transformations as global values (which will not be logged by the forwarding service), an override field to override transformations, a body field representing the body of the request, a header to map the fields which will become the headers of the request, and a urlparam field to become the query string of the request. Additional fields may include a variable to tokenize all applicable payment methods before forwarding to a third party, tokenization service provider options, a maximum amount a tokenized primary account number can be charged, a currency code, and a URL to which a request will be made (which may include multiple URLs).

In the sequence diagram described above with reference to FIG. 4, the integration platform creates the payment for the goods, and transmits the created payment to a payment provider. In one embodiment, the integration platform may not create the payment for the goods, and instead, the merchant's electronic commerce platform may create the payment itself. However, depending on the merchant's desires, the embodiment in which the integration platform creates the payment for the goods and transmits the payment to the payment provider may be more beneficial, as such an arrangement reduces or eliminates the need for the merchant or the merchant's electronic commerce platform to comply with security standards for storage and transmission of potentially sensitive credit card details, such as PCI DSS.

A standard API, such as that provided by the integration platform, as described herein, allows a third party channel to enable its users to purchase products from multiple merchants, using that one standard API. Thus, for example, once the third party channel has established and configured access for the integration platform, the third party channel can enable purchases from merchants A, B, and C, without individually configuring access to each such merchant.

Correspondingly, such a standard API, on the merchant side, may allow the merchant to offer its products to users of multiple third party channels, using the standard API's connection to the merchant's electronic commerce platform. Thus, for example, once the merchant has established and configured access for the integration platform to its electronic commerce platform, the merchant can enable users of third party channel X, Y, and Z, without individually configuring each third party channel's access to the electronic commerce platform.

In one embodiment, prior to enrollment or use of an integration platform, a third party channel or merchant may need to create a merchant account with the integration platform, or an associated payment processor, such as BRAINTREE®. Such an account may provide a vault functionality for user payment methods, the use of payment method tokens, the initiating of orders, and facilitation of transactions with connected merchants.

In one embodiment, after registration with the integration platform, credentials for the integration platform may be provided to the third party channel or merchant, which may include a client identifier and a client secret. Such credentials may provide an integration platform plug-in, third party channel, or merchant electronic commerce platform access to APIs of the integration platform. In one embodiment, the credentials may enable the ability for the third party channel to retrieve products from a merchant's electronic commerce platform, create orders for the electronic commerce platform, and other operations. In one embodiment, the third party channel may provide a destination uniform resource locator (URL) to the integration platform that acts as a webhook, or a callback mechanism, so that the integration platform can deliver notifications when transactions are initiated by the channel, as is described further herein. In one embodiment, the third party channel may have direct links to products that it wishes to sell. Such links may be used to request product information via the integration platform APIs, as described herein. Such links may be obtained from merchants directly, without going through the integration platform.

Figure 7:
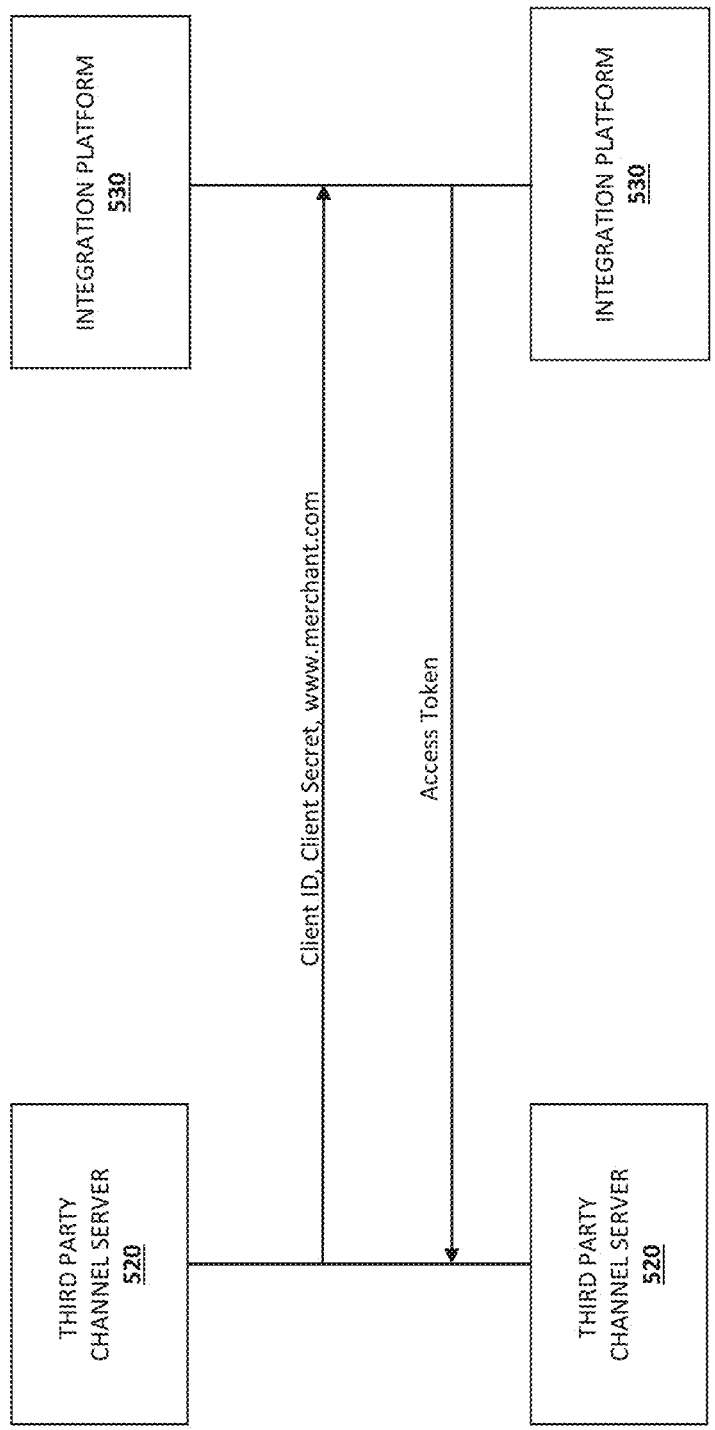
FIG. 7 is a further flow diagram illustrating a sequence of operations between multiple computing devices.

In one embodiment, a merchant or retailer token may be requested by the third party channel, so that the integration platform can determine how to obtain an access token for the third party channel which can then be used to make calls to the APIs of the integration platform for a particular merchant. In one embodiment, the request for a merchant electronic commerce platform token includes the third party channel's client identifier and the client secret, and may further include an identifier for the merchant or merchant electronic commerce platform (such as a domain name for the merchant) and an identifier for the third party channel. FIG. 7 is an example of such an interaction between a third party channel server and the integration platform. In response, the integration platform may provide an access token and an expiration time for the access token. In one embodiment, the requests and responses are transmitted as POST HTTP requests in JSON (JavaScript Notation) format. In one embodiment, the access token is cached. Upon expiration of the access token, calls to the APIs of an integration platform may return an HTTP 403 status code. In one embodiment, once a token expires, the third party channel may request a new access token and cache the access token again.

In one embodiment, merchants may need to opt-in to enable purchasing through a third party channel. Thus, if a third party channel were to request a token for a merchant that had not authorized the third party channel, an HTTP error status code may be returned, such as an HTTP 400 status. In one embodiment, if a merchant revokes the grant of a token, which the merchant may do at any time, requests made with the token may result in an HTTP 403 status, and requests for new tokens may result in an HTTP 400 status.

In one embodiment, customer tokens and store (or merchant) tokens may be used to control access to certain operations of the integration platform. Such tokens may be associated with a particular third party channel and merchant, and accounted tokens may provide access to a particular customer's account. Some calls to APIs of the integration platform can only be made with accounted tokens, such as creation of an order, and retrieving a customer's shipping address. Other calls to the APIs of the integration platform can be made with or without an accounted token, such as retrieving information about a product.

In one embodiment, tokens have an expiration date, which may be roughly 60 days after issuance. In one embodiment, the expiration threshold or timeout may be smaller than 60 days. Once a token is expired, in one embodiment, a new token may be obtained for each request. Alternatively, tokens may be obtained, cached, and handled upon expiration.

As described above, a merchant or retailer token (store token) may be requested by the third party channel using a client identification and a client secret, and a merchant identification. The integration platform may respond with an access token and an expiration time for the token. Once the token is received, requests may be made that do not require a customer context, that is, any information that is not specific to a customer. Thus, such a store token may be used to retrieve information about particular products offered by a merchant.

Similarly, a customer token may be requested by the third party channel using the client identification, client secret, and a unique customer identifier. Assignment of the unique customer identifier may be controlled by the third party channel, but must be unique and immutable. Thus, the customer's username or e-mail address for the third party channel may be used, provided that the user cannot later change that identifier. Thus, in one embodiment, the integration platform may recommend use of an internal, unchanging identifier. To request a customer token, the third party channel may issue a request which includes, as described above, a client identification, client secret, customer identification, and a merchant identification. The integration platform may respond with an access token and an expiration time for the customer token.

To obtain products which can be purchased, the third party channel may issue a request to the integration platform API. In many cases, a product may be shared using a web URL. The third party channel may determine whether or not the product is sellable by retrieving product information from the integration platform API.

Thus, for example, if a user of the third party channel creates a post and shares a link to a shirt at a given URL on a merchant's website, the third party channel may issue a GET request to the integration platform API using the URL for the shirt and the third party channel's access token. If the merchant for the URL is registered with the integration platform and opted-in to selling through the third party channel, the integration platform may respond with the information needed to display the product on the third party channel and enabled for sale.

Thus, the response to the GET request may include various elements of data, in a JSON formatted response, for the shirt, such as a high price, a high suggested price, a product type name, a low price, whether the product requires shipping, an address for images of the product and characteristics of the images, whether the product is in stock, variants (e.g., size, color) of the product, inventory information for the product, a SKU identifier, descriptive text, a name for the product, a UPC for the product, keyword information for the product, and any other information provided by the merchant electronic commerce platform. In one embodiment, each product variant (e.g., different color, size, texture, etc.) may have its own SKU or unique identifier. For example, a black t-shirt sold by a retailer that is available in small and medium may have a SKU for each size. When a user decides to place an order, the SKU for the specific variant is used in the order process. In one embodiment, responses from a GET request may be cached for a period of time, such as five minutes. In one embodiment, if the user proceeds to order the product, up-to-date (i.e., non-cached) information is retrieved to obtain the full cost for the purchase.

Figure 8:
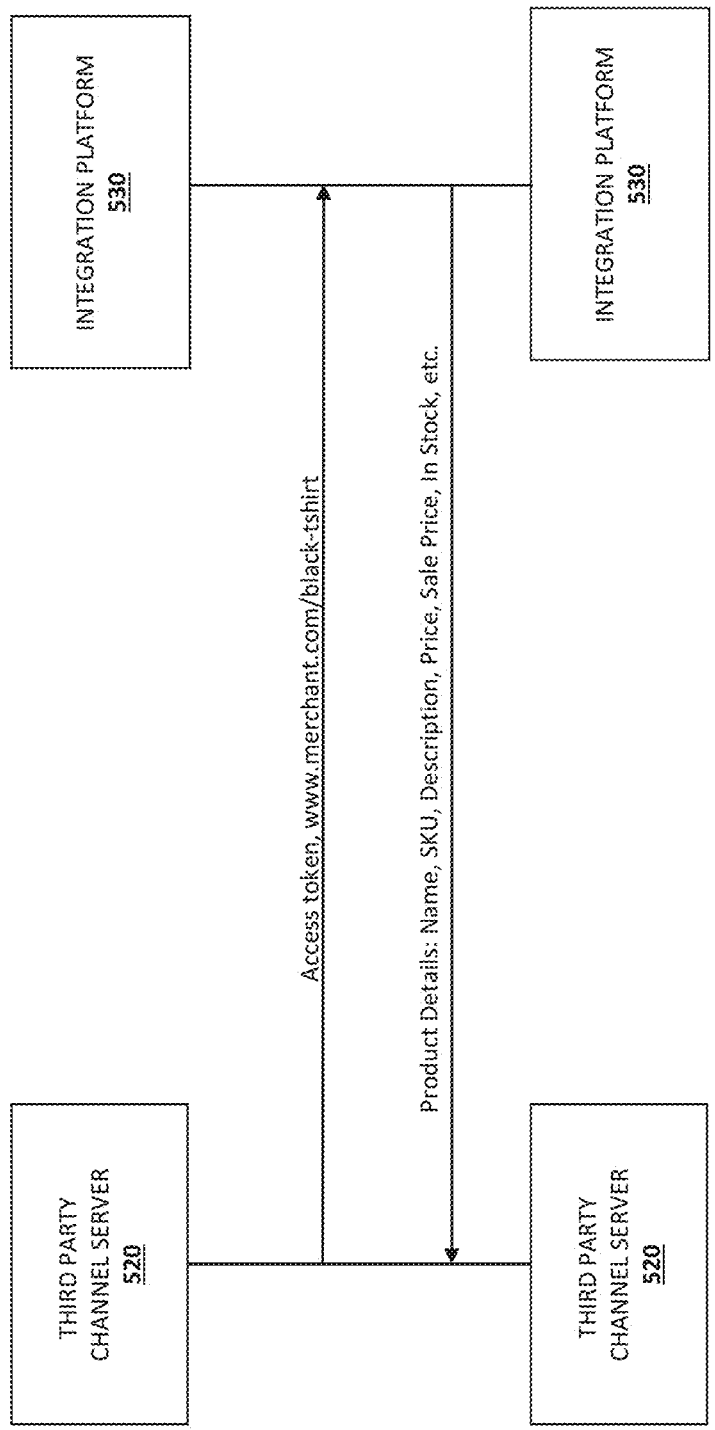
FIG. 8 is a flow diagram illustrating a sequence of operations between multiple computing devices.

In one embodiment a simple GET request may request all available products from a merchant, using an access token (e.g., "GET/products HTTP/1.1" submitted with an access token). FIG. 8 is an example of such an interaction between a third party channel and the integration platform: the third party channel server transmits a request using its access token, and the integration platform responds with details for the requested product. In one embodiment, product listings may be paginated and filtered by various criteria, such as a category, UPC, SKU, name, or description. In one embodiment, a page size may be changed by utilizing a query string parameter (e.g., "GET/products?per_page=20 HTTP/1.1" submitted with an access token). A default page size may return 12 products, and a response time may increase if additional products are requested. To retrieve subsequent pages (e.g., the $21^{st}$-$40^{th}$ product), a page query string parameter (e.g., "GET/products?per_page=20&page=2 HTTP/1.1" submitted with an access token) may be utilized, indexed starting at 1.

In one embodiment, filtering a product listing using a free form query (e.g., across product names, descriptions, UPCs, and SKUs) a "q" parameter may be used (e.g., "GET/products?q=frozen&per_page=40&page=2 HTTP/1.1" submitted with an access token). Other filters may allow searching by category or category slug, the name field of products, the description field of products, whether a product is in stock, a SKU, or a UPC. In one embodiment, such searches may return a "count" of the number of matched record. In one embodiment, results of such a query may return multiple products with the "best" match as the first result.

Figure 9:
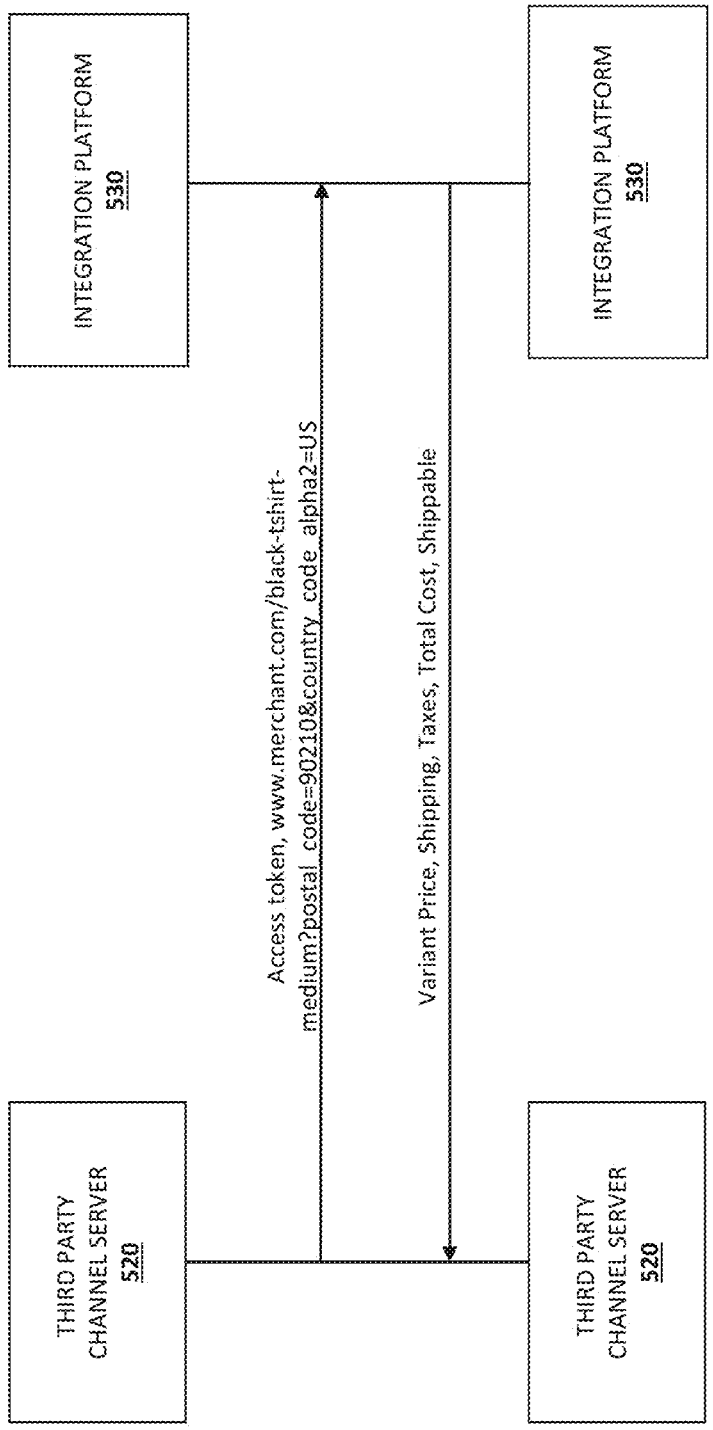
FIG. 9 is a flow diagram illustrating a sequence of operations between multiple computing devices.

In one embodiment, a specific product may be returned to retrieve, among other information, a purchase cost for a particular product, given a shipping location. For example, when a customer or user intends to purchase a product, an accurate snapshot of the costs to be incurred is likely necessary. Not performing such a task may lead to confusion, chargebacks, and a poor user experience. The costs include a combination of the price of the product itself along with sales tax and shipping costs. Sales tax and shipping costs may be determined by the physical location of the merchant and where the product will be shipped. Physical locations of merchants, tax overrides, and shipping rates may be maintained by the integration platform. Once the integration platform receives the location of the desired shipment, which may include, for example, a postal code and country, the integration platform may determine the shipping cost and total cost. In one embodiment, to obtain the full cost, a request is made to an endpoint for the specific product and variant of that product (using, for example, the SKU for the variant), and the request may include a postal code and country code query string parameters to indicate the destination. The parameters may allow the API to determine whether or not the merchant ships to the requested location, and what taxes and shipping costs may be assessed if the product is purchased. FIG. 9 is an example of such an interaction between a third party channel and the integration platform: the third party channel server transmits a request using its access token, the variant, a postal code and country code for shipping, and the integration platform responds with details for the requested purchase, including the price for the variant, shipping cost, taxes, a total cost for the purchase, and whether the product is shippable to the requested country and postal code.

Thus, to retrieve a purchase cost for a particular product, given a shipping location, a GET request may be made with a shipping country variable in a valid ISO 3166-1 2 letter code, for example, as follows: "GET/products/JUNIOR-PHASER?shipping_zipcode=60647&shipping_country=US HTTP/1.1" with an access token. The response may appear similar to a product listing response, but with additional top-level key data containing the shipping, tax, and total costs if the customer were to purchase the product and ship it to the zip code and country contained in the request.

Figure 10:
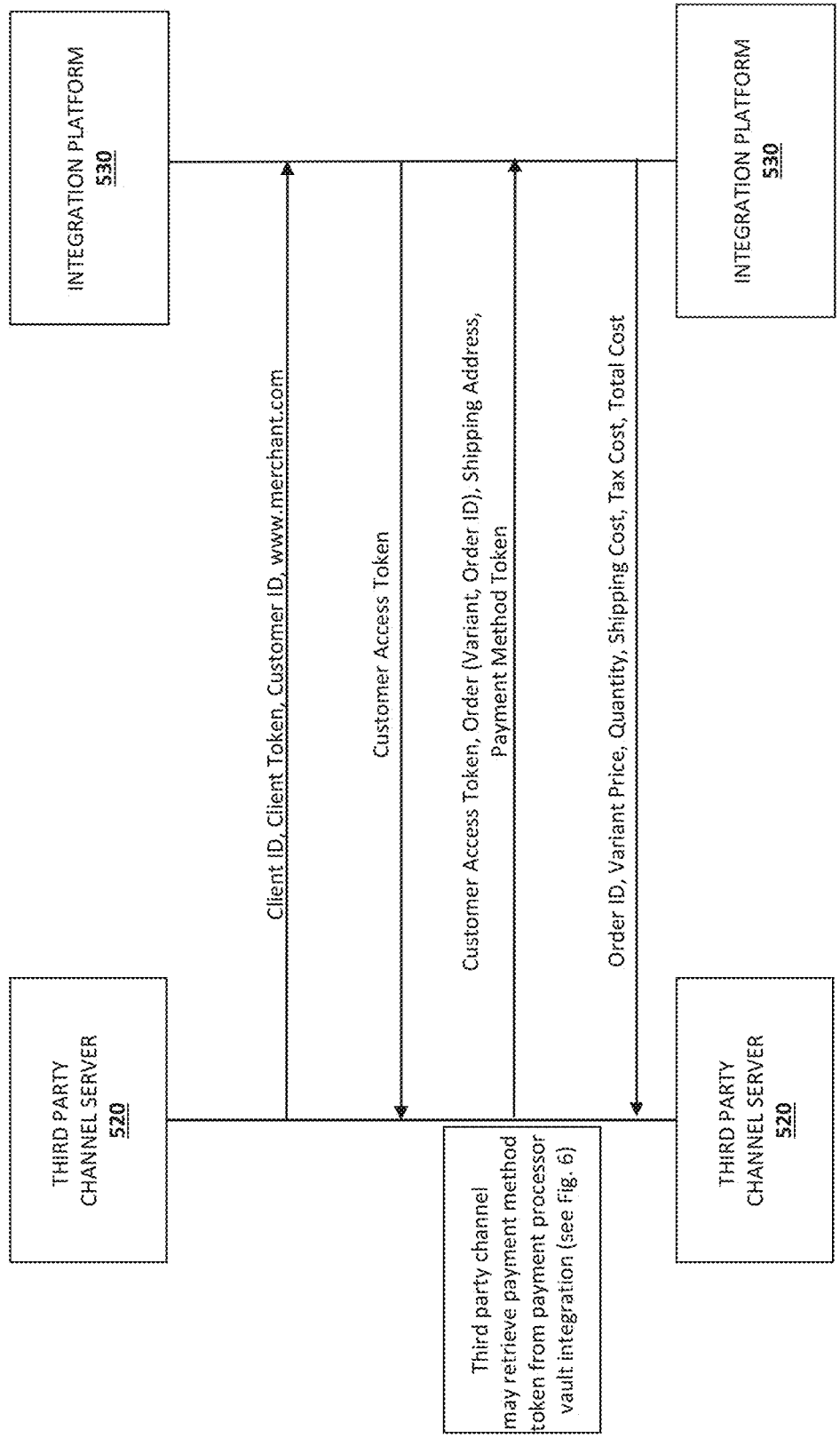
FIG. 10 is a flow diagram illustrating a sequence of operations between multiple computing devices.

In one embodiment, order calls to the integration platform API must include a customer token. In one embodiment, to obtain a user token, a unique customer ID must exist for each user, such as a username or numerical identifier. A request for an order token may be transmitted using a POST request which includes a client identifier, a client secret (e.g., token), a merchant domain, and the user's unique customer identifier. In one embodiment, the integration platform API responds with a customer access token as well as an expiration time for the token. The customer access token may be cached and refreshed upon expiration. When the customer indicates an intent to purchase a product, the third party channel must create an order in the integration platform. The order should include, in one embodiment, the product to be purchased (addressed by the SKU) and where the product should be shipped. Thus, in one embodiment, a POST request which includes the customer token, SKU information, and shipping address may be transmitted. In one embodiment, an order identifier for the third party channel may also be included in the request, for tracking of the order by the third party channel. Further, in one embodiment, payment method information may be included in the request. FIG. 10 is an example of such an interaction between a third party channel and the integration platform. The third party channel server transmits a client identifier, a client token, an identifier for the customer, and the merchant domain. The integration platform responds with a customer access token. The customer access token is used by the third party channel and transmitted with the order, including the variant and order identifier, a shipping address, and the payment method token for the user's payment method, which may be retrieved from the payment processor vault integration as shown in FIG. 6. The integration platform then responds with the order identifier, the variant price, quantity, shipping cost, tax cost, and total cost for the product.

Figure 11:
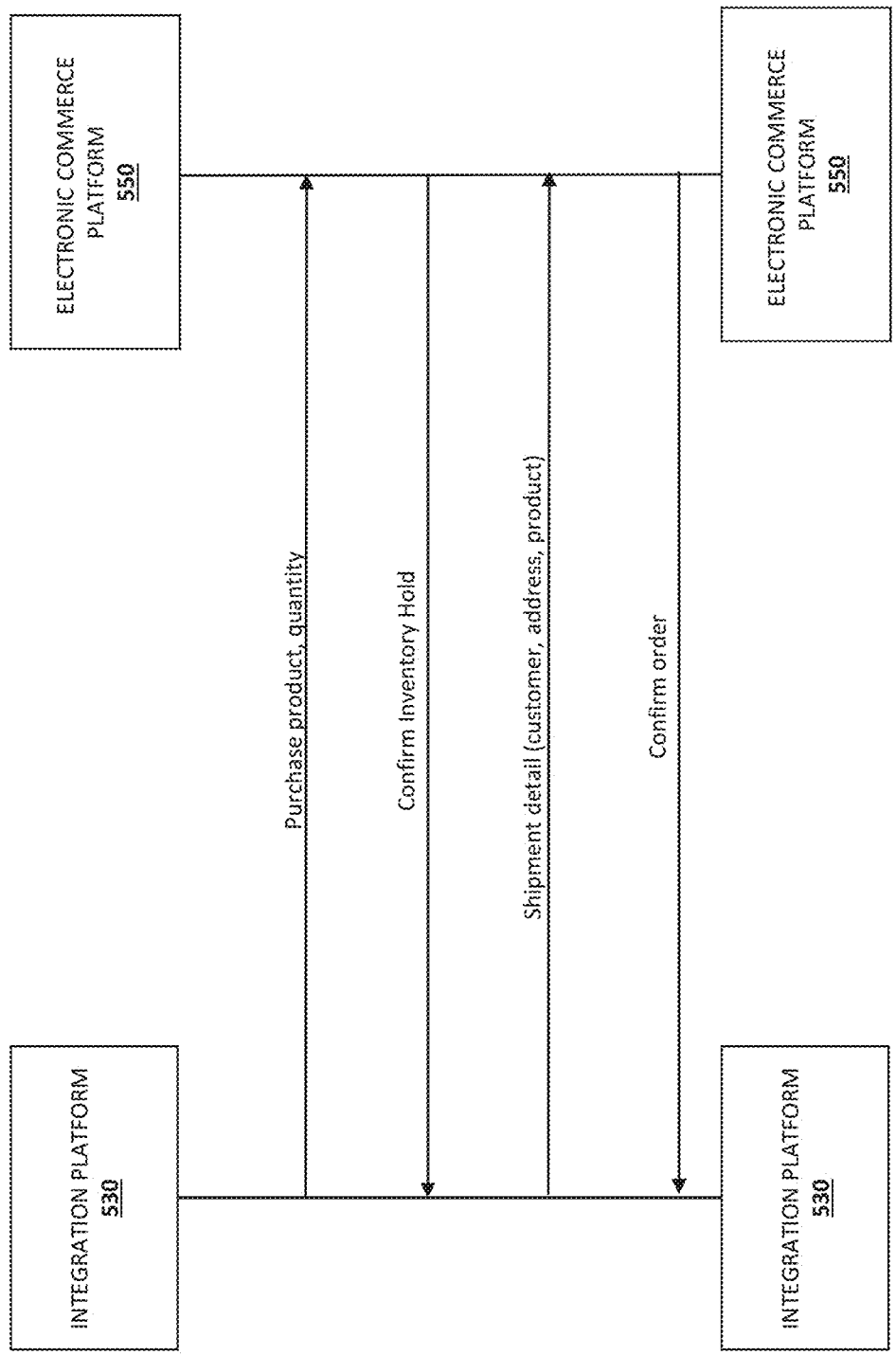
FIG. 11 is a flow diagram illustrating a sequence of operations between multiple computing devices.

Upon creation of an order by the third party channel, the order is transmitted to the merchant's electronic commerce platform, which may begin fulfilling the order immediately. The order identifier may be stored by the integration platform and may be used as a reference when communicating order status to the third party channel. The integration platform API may return a response that includes an HTTP 201 status code, and full cost information associated with the order, for example, a breakdown of the price for the product variant, the quantity ordered, the shipping cost, any taxes, and a total cost variable. Once the merchant fulfills a purchase facilitated by the integration platform API, a webhook message that includes the order identifier and a status identifier (e.g., "fulfilled") may be delivered by the integration platform API. FIG. 11 is an example of an interaction between the integration platform and the merchant's electronic commerce platform. The integration platform may transmit a request to purchase a product and the quantity of the purchase to the electronic commerce platform, which may respond with a confirmation of an inventory hold. Shipment details, including the customer, address, and product, may be transmitted from the integration platform to the electronic commerce platform, and in response, the electronic commerce platform may respond with a confirmation of the order.

In one embodiment, a shipping address for a user may include component variables such as a customer's first name and last name, the customer's street address and extended address (e.g., unit or apartment number), a locality (e.g., city), a region (e.g., state), a postal code, an alphanumeric country code, and a phone number. Certain component variables may be optional in some embodiments.

In one embodiment, if an error occurs during order creation, the integration platform API may return a HTTP 400 status code, along with a JSON formatted response body indicating why the error occurred. Common errors may be the result of improperly formatted request bodies, SKUs not existing, products out of inventory, merchant limitations on shipping destinations, revocation or expiration of access tokens, and payment failures.

In one embodiment, a third party channel may determine whether a particular merchant has granted or revoked access to its electronic commerce platform by listening for onboarding and offboarding webhook messages. In one embodiment, these messages may be used to track a list of which merchants have onboarded, and this list may be kept up to date when those merchants are offboarded. In one embodiment, when a merchant grants authorization to query an integration platform for the merchant's products offered through an electronic commerce platform, an onboarding message may be received by the third party channel. Such an onboarding message may be a JSON formatted response, and may include as its topic the value "retailer", an "action" variable set to "created," and a "retailer" variable having a domain name of the merchant. An offboarding message may include the same topic and retailer variable, and an "action" variable set to "deleted." Once a merchant has offboarded, merchant-specific access tokens and other credentials may no longer be valid. In one embodiment, onboarding and offboarding messages are delivered to a third party channel destination URL immediately upon a successful event. If the third party channel server does not respond with an HTTP 200 status code within 10 seconds, message delivery may be retried over a period of time, such as 12 hours. After each attempt, the delay before the next attempt may be increased.

In one embodiment, when a user chooses a financial instrument to use for purchasing products, the integration platform may require that the payment method be converted to a nonce associated with a payment processor, using a payment integration method. Such conversion ensures that the third party channel does not store sensitive payment information on its servers. The nonce provided by the payment integration method may be valid for 24 hours. In one embodiment, the payment method may be stored by vaulting the payment method nonce and generating a payment method token. Once the third party channel has obtained a token for the customer's payment method and stored it, orders may be created for that customer. Additionally, when an order is created for a merchant, the request body may include a section designating the payment method token from which funds should be collected.

In one embodiment, if a merchant is using a payment processor associated with the integration platform (e.g., BRAINTREE® provides both the integration platform and serves as payment processor), the integration platform may convert the payment method token to a token usable in the retailer's account with the payment processor. Thus, the third party channel may transmit the payment method to an integration platform gateway for the third party channel, which in turn returns a payment method token. The third party channel may then transmit, to the integration platform, a request to create an order with a SKU number and the partner token. The integration platform may request that the integration platform gateway convert the token, which is then returned as a merchant or retailer token. The integration platform may thereafter submit an authorize request with the retailer token to a payment processor gateway for the merchant, which returns a transaction identifier. The integration platform may then transmit an order creation request to the merchant's electronic commerce platform (or integration platform plug-in), which then creates the order for the user's purchase.

In one embodiment, if the merchant is using a payment processor other than one associated with the integration platform, the integration platform may convert the payment method token from the third party channel to a network tokenized credit card, also referred to as a personal account number or PAN. Thus, the third party channel may transmit the payment method to an integration platform gateway, which in turn returns a payment method token. The third party channel may then transmit, to the integration platform, a request to create an order with a SKU number and the partner token. The integration platform may request that the integration platform gateway for the third party channel convert the token, which is then returned as a network tokenized credit card. The integration platform may thereafter submit an authorize request with the network tokenized credit card to a payment processor gateway for the merchant, which returns a transaction identifier. The integration platform may then transmit an order creation request to the merchant's electronic commerce platform (or integration platform plug-in), which then creates the order for the user's purchase.

Figure 12:
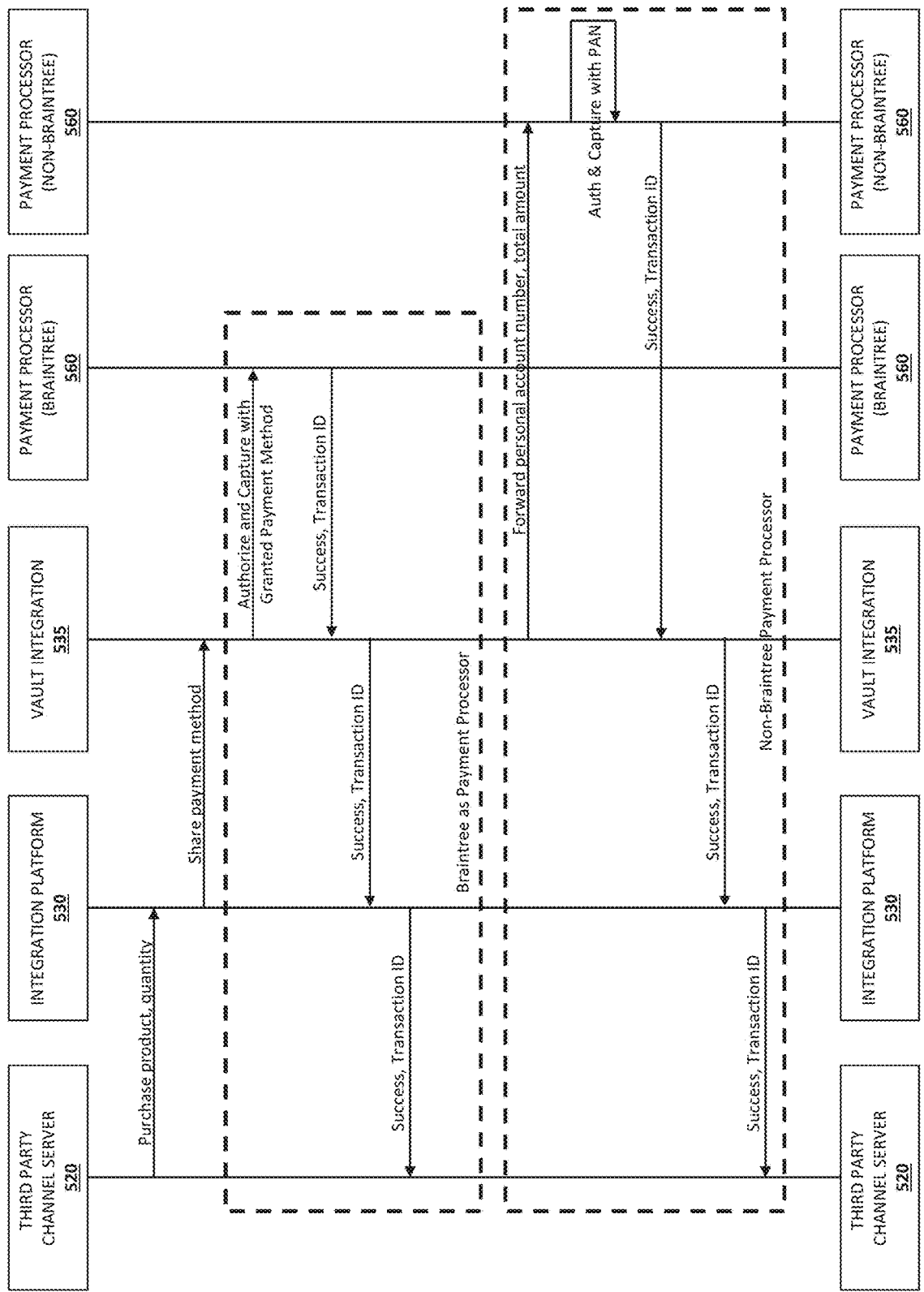
FIG. 12 is a flow diagram illustrating a sequence of operations between multiple computing devices.

FIG. 12 is an example of interactions between a third party channel server, an integration platform, and a payment processor vault integration, and describes the scenarios for a payment processor associated with the integration platform (e.g., BRAINTREE®) and a payment processor not associated with the integration platform. In FIG. 12, if the payment processor is associated with the integration platform, the third party channel server may transmit a purchase request with the product and quantity information to the integration platform, which in turn transmits a request to the vault integration to share the payment method for the user. The vault integration then transmits a request to authorize and capture the payment with the payment method. In response, the payment processor associated with the integration platform transmits a success notification and a transaction identifier, which is then transmitted to the integration platform and then the third party channel server. If the payment processor is not associated with the integration platform, then the vault integration transmits the user's personal account number as described above. The non-associated payment processor authorizes and captures the payment using the personal account number, and transmits a success notification to the vault integration, which in turn is transmitted to the integration platform and then to the third party channel server.

In one embodiment, the integration platform provides notifications to third party channels using a web hook. An API of the integration platform may transmit a request to the third party channel servers with a reference to an order identification and other relevant information about the order.

In one embodiment, requests transmitted among the various devices and parties are signed with a keyed-hash message authentication code. In one embodiment, when an order's status changes, a web hook may be dispatched to an endpoint in the third party channel's system that may choose to consume the new state of the order. Such an order update may trigger a notification to the user or customer, or could trigger the capture of funds if the third party channel is facilitating a financial transaction. In one embodiment, the third party channel responds with an HTTP status code 200 to the update, within 10 seconds in some examples. If the HTTP status code 200 is not received, or takes longer than 10 seconds, a retrying protocol may be observed. Additional attempts to deliver the web hook may continue until twenty total deliveries have been attempted or 48 hours have passed since the initial delivery. After each retry, a delay may be observed, with the initial delay being 5 seconds. After each subsequent failure, the delay may be doubled, up to 12 hours.

Figure 13:
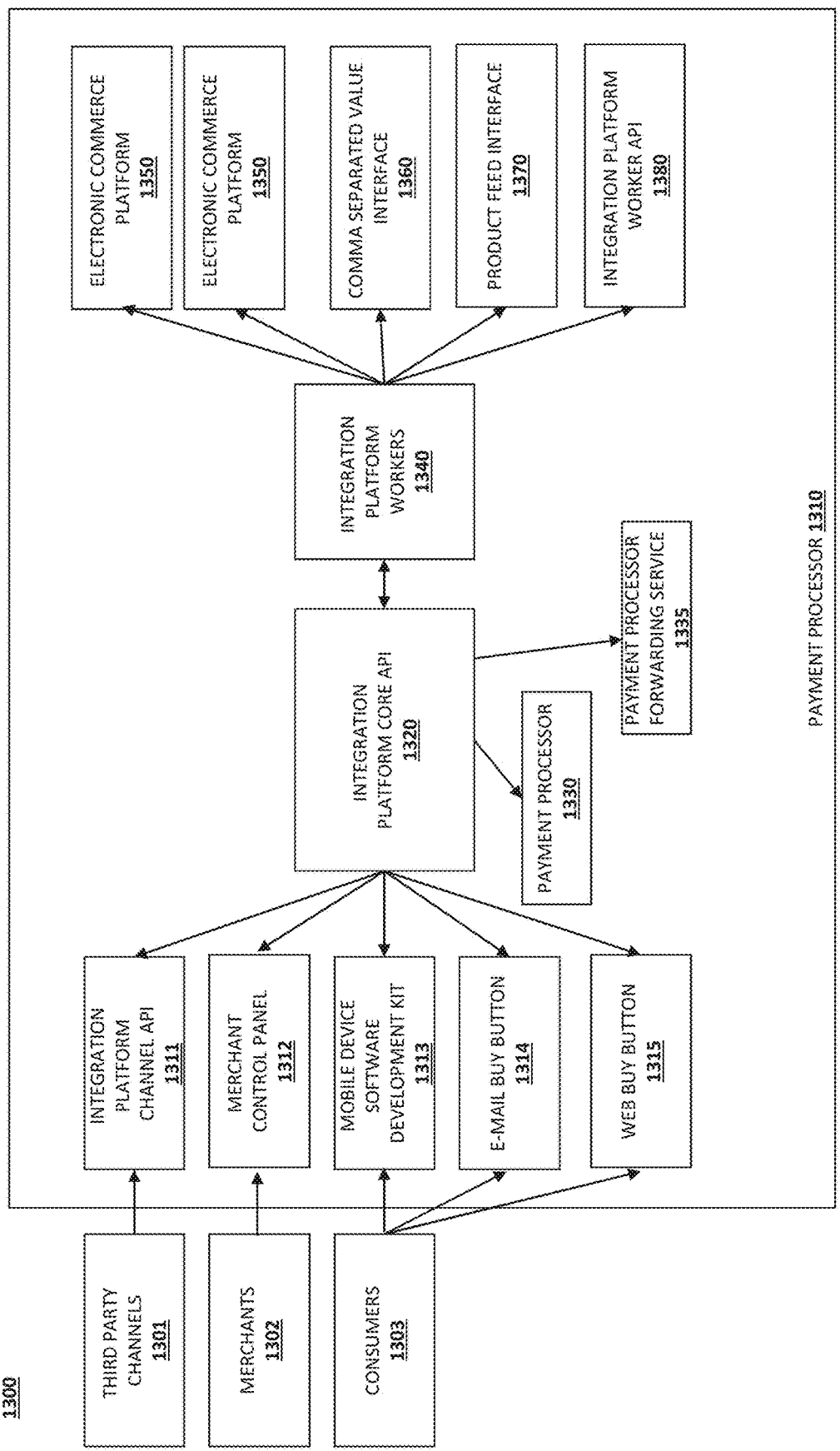
FIG. 13 is a schematic view illustrating an embodiment of a networked system.

Referring now to FIG. 13, a schematic view 1300 of the integration platform and other components is depicted. As shown in FIG. 13, third party channels 1301 operate in conjunction with an integration platform channel API 1311, which itself operates in conjunction with an integration platform core API 1320. Merchants 1302, such as any merchant described above, may utilize a merchant control panel 1312 provided by payment processor 1310 to administer products to be sold, track statistics of sales, and other tasks. Consumers 1303 may purchase products by way of software which uses a mobile device software development kit 1313, or may also use an e-mail buy button 1314 or web page buy button 1315, as described herein. Integration platform core API 1320 operates to facilitate access by the various components directly with a payment processor 1330 (e.g., BRAINTREE®) through a payment processor forwarding service 1335 (e.g., to a non-BRAINTREE®) payment processor. Integration platform workers 1340 may provide an interface to multiple electronic commerce platforms 1350, and may also provide a comma separated value (CSV) interface 1360 which may allow merchants to upload lists of products in a structured data format. Similarly, a product feed interface 1370 may be used by merchants to provide a feed, such as a RSS (really simple syndication) feed or XML feed of products to be sold. Integration platform worker API 1380 may operate in conjunction with integration platform workers 1340 to provide or mediate access between electronic commerce platforms 1350, CSV interface 1360, product feed interface 1370, and the integration platform core API. Elements 1311, 1312, 1313, 1314, 1315, 1320, 1330, 1335, 1340, 1350, 1360, 1370, 1380 may all be part of or provided in part by a payment processor 1310.

Referring now to FIG. 14, an example of a merchant dashboard is depicted in accordance with one embodiment of the integration platform described herein. The merchant dashboard may identify the name of the merchant (e.g., "T-Shirt Shop"), and may provide various menu options along the left side which link to various web pages, including a link to the Dashboard (currently displayed), a link to a list of orders, a link to set up a mobile device application, a link to information about the integration platform, a link to information about the integration platform team, a support link, and an advanced features link. Within the dashboard, the merchant may choose to use the Mobile SDK option to set up a mobile application, or may use the Email Buy option to set up Email Buy buttons. Similarly, the merchant may choose to use Embedded Buy Buttons to set up buttons to be placed on web pages. The dashboard may also instruct the merchant to set up and provide various information to start selling through the integration platform. For example, the dashboard may instruct the merchant to add products, configure tax rates, connect a payment gateway or payment processor, and set up shipping methods.

The various devices, platforms, and servers described in FIG. 1 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 100, and/or accessible over the network 105.

The network 105 may be implemented as a single network or a combination of multiple networks. For example, in various embodiments, the network 105 may include the Internet and/or one or more intranets, landline networks, wireless networks, and/or other appropriate types of networks.

The client devices 110 may be implemented using any appropriate combination of hardware and/or software configured for wired and/or wireless communication over network 105. For example, in one embodiment, client devices 110 may be implemented as a personal computer of a user in communication with the Internet. In other embodiments, the client device 110 may be a smart phone, personal digital assistant (PDA), laptop computer, and/or other types of computing devices.

The client device 110 may include one or more browser applications which may be used, for example, to provide a convenient interface to permit the payer to browse information available over the network 105. For example, in one embodiment, the browser application may be implemented as a web browser configured to view information available over the Internet.

The client device 110 may also include one or more toolbar applications which may be used, for example, to provide user-side processing for performing desired tasks in response to operations selected by the payer. In one embodiment, the toolbar application may display a user interface in connection with the browser application.

The client device 110 may further include other applications as may be desired in particular embodiments to provide desired features to the client device 110. In particular, the other applications may include a payment application for payments assisted by a payment processor through the payment processor 160. The other applications may also include security applications for implementing user-side security features, programmatic user applications for interfacing with appropriate application programming interfaces (APIs) over the network 105, or other types of applications. Email and/or text applications may also be included, which allow the payer to send and receive emails and/or text messages through the network 105. Third party channel applications may also be included, which allow the payer or user to access a third party channel as discussed herein. The client device 110 includes one or more user and/or device identifiers which may be implemented, for example, as operating system registry entries, cookies associated with the browser application, identifiers associated with hardware of the client device 110, or other appropriate identifiers, such as a phone number. In one embodiment, the user identifier may be used by the payment processors 160 and/or third party channels 120 to associate the user with a particular account as further described herein. In one embodiment, the user identifier may be used to view information posts, as described herein.

The merchant devices 140 may be maintained, for example, by a conventional or on-line merchant, conventional or digital goods seller, individual seller, and/or application developer offering various products and/or services in exchange for payment to be received conventionally or over the network 105. In this regard, the merchant device 140 may include a database identifying available products and/or services (e.g., collectively referred to as items) which may be made available for viewing and purchase by the payer. Such information may also be maintained by an electronic commerce platform 150.

The merchant devices 140 and electronic commerce platforms 150 may also include a checkout application which may be configured to facilitate the purchase by the payer of items. The checkout application may be configured to accept payment information from the user through the client device 110, or from the payment processor through a payment processor device 160, over the network 105. The merchant device 140 and/or electronic commerce platform 150 may also include web server software for hosting a merchant web site. The merchant devices 140 or electronic commerce platforms 150 may also communicate with payment processor devices 160 over the network 105 to receive an approval for a credit card transaction requested by a user utilizing a client device 110.

Figure 15:
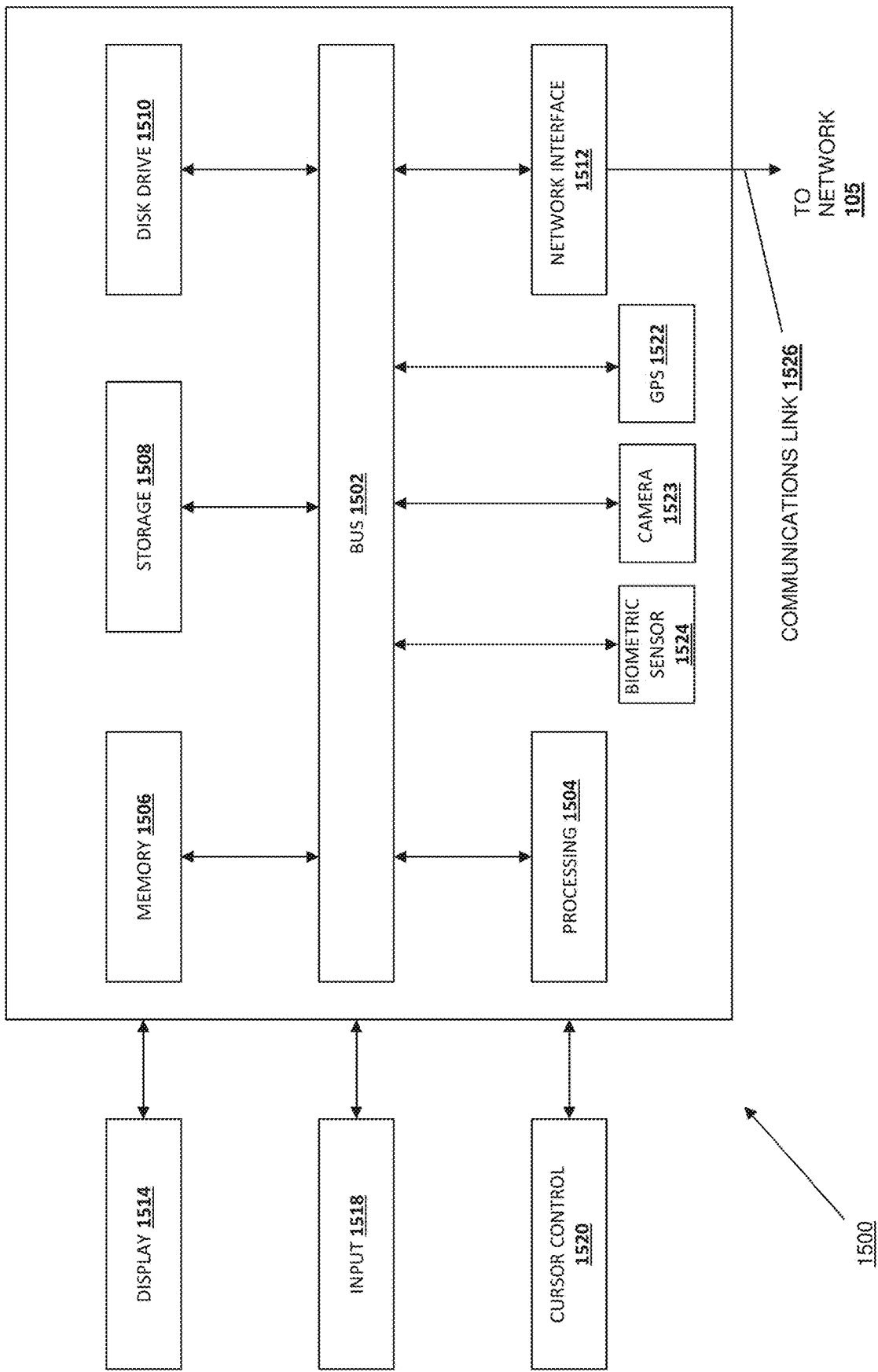
FIG. 15 is a schematic view illustrating an embodiment of a computer system.

Referring now to FIG. 15, an embodiment of a computer system 1500 suitable for implementing, for example, the client device 110, third party channels 120, integration platform 130, merchant devices 140, electronic commerce platforms 150, and/or payment processors 160, is illustrated. It should be appreciated that other devices utilized by customers, merchants, third party channels, payment service providers, and/or other parties in the system discussed above may be implemented as the computer system 1500 in a manner as follows.

In accordance with various embodiments of the present disclosure, computer system 1500, such as a computer and/or a network server, includes a bus 1502 or other communication mechanism for communicating information, which interconnects subsystems and components, such as a processing component 1504 (e.g., processor, micro-controller, digital signal processor (DSP), etc.), a system memory component 1506 (e.g., RAM), a static storage component 1508 (e.g., ROM), a disk drive component 1510 (e.g., magnetic or optical), a network interface component 1512 (e.g., modem or Ethernet card), a display component 1514 (e.g., CRT, LCD, touch-sensitive display device, etc.), an input component 1518 (e.g., keyboard, keypad, virtual keyboard, touch-sensitive display device), a cursor control component 1520 (e.g., mouse, pointer, or trackball), a location determination component 1522 (e.g., a Global Positioning System (GPS) device as illustrated, a cell tower triangulation device, a Wi-Fi triangulation device, a Bluetooth-based location device, and/or a variety of other location determination devices known in the art), and/or a camera device 1523. The computer system 1500 may also include a biometric sensor component 1524, which may include a fingerprint sensor with associated software, facial recognition hardware and/or software, retinal detection hardware and/or software, or audio analysis hardware and/or software. In one implementation, the disk drive component 1510 may comprise a database having one or more disk drive components.

In accordance with embodiments of the present disclosure, the computer system 1500 performs specific operations by the processor 1504 executing one or more sequences of instructions contained in the memory component 1506, such as described herein with respect to the devices 110, 120, 130, 140, 150, and 160. Such instructions may be read into the system memory component 1506 from another computer readable medium, such as the static storage component 1508 or the disk drive component 1510. In other embodiments, hard-wired circuitry may be used in place of or in combination with software instructions to implement the present disclosure.

Logic may be encoded in a computer readable medium, which may refer to any medium that participates in providing instructions to the processor 1504 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1510, volatile media includes dynamic memory, such as the system memory component 1506, and transmission media includes coaxial cables, copper wire, and fiber optics, including wires that comprise the bus 1502. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1500. In various other embodiments of the present disclosure, a plurality of the computer systems 1500 coupled by a communication link 1526 to the network 105 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1500 may transmit and receive messages, data, information and instructions, including one or more programs (i.e., application code) through the communication link 1526 and the network interface component 1512. The network interface component 1512 may include an antenna, either separate or integrated, to enable transmission and reception via the communication link 1526. Received program code may be executed by processor 1504 as received and/or stored in disk drive component 1510 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A third-party channel integration platform system, comprising:
   a non-transitory memory; and
   one or more hardware processors coupled to the non-transitory memory and configured to read instructions from the non-transitory memory to cause the system to perform operations comprising:
   receiving, through an application programming interface (API) associated with a third-party server, a request to retrieve product information for a product associated with a first user, the request including a plurality of payment details;
   generating a token for the request based on tokenizing the plurality of payment details;
   transmitting the token through the API associated with the third-party server for processing the product information;
   receiving, through the API, the token, an order identifier, and a variant of the product as retrieved from a payment processor vault;
   determining a product cost and a variant price associated with the token and the order identifier; and transmitting the product cost and the variant price in response the determining.

2. The third-party channel integration platform system of claim 1, wherein the request further includes a client token and a customer identifier.

3. The third-party channel integration platform system of claim 1, wherein the token includes a temporary customer access token.

4. The third-party channel integration platform system of claim 1, wherein the operations further comprise:
obtaining the product information associated with the request from a merchant electronic commerce platform.

5. The third-party channel integration platform system of claim 1, wherein the request to retrieve the product information is received in response to a purchase cost request on the third-party server via a third party social media website.

6. The third-party channel integration platform system of claim 4, wherein the operations further comprise providing an interface to the merchant electronic commerce platform and the third-party server.

7. The third-party channel integration platform system of claim 1, wherein the product information includes product characteristics and marketing details.

8. The third-party channel integration platform system of claim 4, wherein the operations further comprise connecting the merchant electronic commerce platform via multiple third party channels.

9. A method comprising:
receiving, by an integration system, through an application programming interface (API) associated with a third-party server, a request to retrieve product information for a product associated with a first user, the request including a plurality of payment details;
generating a token for the request based on tokenizing the plurality of payment details;
transmitting the token through the API associated with the third-party server for processing the product information;
receiving, through the API, the token, an order identifier, and a variant of the product as retrieved from a payment processor vault;
determining, by the integration system, a product cost and a variant price associated with the token and the order identifier; and
transmitting the product cost and the variant price in response the determining.

10. The method of claim 9, wherein the request further includes a client token and a customer identifier.

11. The method of claim 9, wherein the token includes a temporary customer access token.

12. The method of claim 9, further comprising:
obtaining the product information associated with the request from a merchant electronic commerce platform.

13. The method of claim 9, wherein the request to retrieve the product information is received in response to a purchase cost request on the third party server via a third party social media website.

14. The method of claim 12, further comprising providing an interface to the merchant electronic commerce platform and the third-party server.

15. The method of claim 9, wherein the product information includes product characteristics and marketing details.

16. The method of claim 12, further comprising connecting the merchant electronic commerce platform with multiple third party channels.

17. A non-transitory machine-readable medium having stored thereon machine-readable instructions executable to cause a machine to perform operations comprising:
receiving, through an application programming interface (API) associated with a third-party server, a request to retrieve product information for a product associated with a first user, the request including a plurality of payment details;
generating a token for the request based on tokenizing the plurality of payment details;
transmitting the token through the API associated with the third-party server for processing the product information;
receiving, through the API, the token, an order identifier, and a variant of the product as retrieved from a payment processor vault;
determining a product cost and a variant price associated with the token and the order identifier; and
transmitting the product cost and the variant price in response the determining.

18. The non-transitory machine-readable medium of claim 17, wherein the request includes a client token and a customer identifier.

19. The non-transitory machine-readable medium of claim 17, wherein the token includes a temporary customer access token.

20. The non-transitory machine-readable medium of claim 17, wherein the operations further comprise:
obtaining the product information associated with the request from a merchant electronic commerce platform.

* * * * *